United States Patent

Struckmeier et al.

[11] Patent Number: 5,824,129
[45] Date of Patent: Oct. 20, 1998

[54] GOB DELIVERY APPARATUS FOR A GLASSWARE FORMING MACHINE

[75] Inventors: Manfred Struckmeier, Obernkirchen; Andreas Graefe, Seggebruch; Eckhard Möller, Obernkirchen, all of Germany

[73] Assignee: The Firm Hermann Heye, Obernkichen, Germany

[21] Appl. No.: 472,862

[22] Filed: Jun. 7, 1995

Related U.S. Application Data

[62] Division of Ser. No. 142,386, filed as PCT/EP92/00432, Feb. 28, 1992, Pat. No. 5,599,370.

[30] Foreign Application Priority Data

May 22, 1991 [DE] Germany ............. 41 16 593.4
Feb. 28, 1992 [WO] WIPO ............. PCT/EP92/00432

[51] Int. Cl.⁶ ............................................. C03B 7/16
[52] U.S. Cl. ............................... 65/207; 65/225; 65/304; 193/3; 193/22
[58] Field of Search ............... 65/165, 72, 207, 65/222, 225, 304, 126, 127; 193/3, 22; 198/536, 640

[56] References Cited

U.S. PATENT DOCUMENTS

| | | |
|---|---|---|
| 1,575,370 | 3/1926 | Lorenz . |
| 1,619,432 | 3/1927 | Mulholland .............. 65/304 |
| 1,755,397 | 4/1930 | Hunter ..................... 65/304 |
| 1,823,062 | 9/1931 | Pleukharp et al. ........ 65/304 |
| 1,911,119 | 5/1933 | Ingle . |
| 2,758,421 | 8/1956 | Smith . |
| 2,859,559 | 11/1958 | Mumford ................. 65/304 |
| 2,873,555 | 2/1959 | Conrad . |
| 3,341,315 | 9/1967 | Patschorke . |
| 3,479,206 | 11/1969 | Patterson . |
| 3,552,942 | 1/1971 | Trudeau .................. 65/304 |
| 3,775,083 | 11/1973 | Nebelung et al. . |
| 4,529,431 | 7/1985 | Mumford . |
| 4,566,894 | 1/1986 | Kulig et al. ............. 65/304 |
| 4,793,847 | 12/1988 | Kawachi et al. ......... 65/304 |
| 5,213,602 | 5/1993 | Foster et al. . |
| 5,254,150 | 10/1993 | Riemer et al. .......... 65/304 |
| 5,298,049 | 3/1994 | Meyer .................... 193/22 |

FOREIGN PATENT DOCUMENTS

| | | |
|---|---|---|
| 1024681 | 5/1958 | Germany . |
| 54-68817 | 6/1979 | Japan . |

*Primary Examiner*—Steven P. Griffin
*Attorney, Agent, or Firm*—Synnestvedt & Lechner

[57] ABSTRACT

Gobs of molten glass fall in succession into a scoop which can be swivelled about a vertical axis and which supplies gobs to a delivery system, for example, of an I.S. glassware forming machine. The gobs travel along a path of movement from the scoop to a trough, and to a deflector which is downwardly curved. The deflector delivers the gobs so that their longitudinal axis lies coaxially with respect to the longitudinal axis of a mold which is to be charged. The lower end of the trough is guided in a vertical chute of the deflector and can be raised and lowered by means of an adjustment device. A setting device having a coupling member permits adjustment of the deflector.

20 Claims, 29 Drawing Sheets

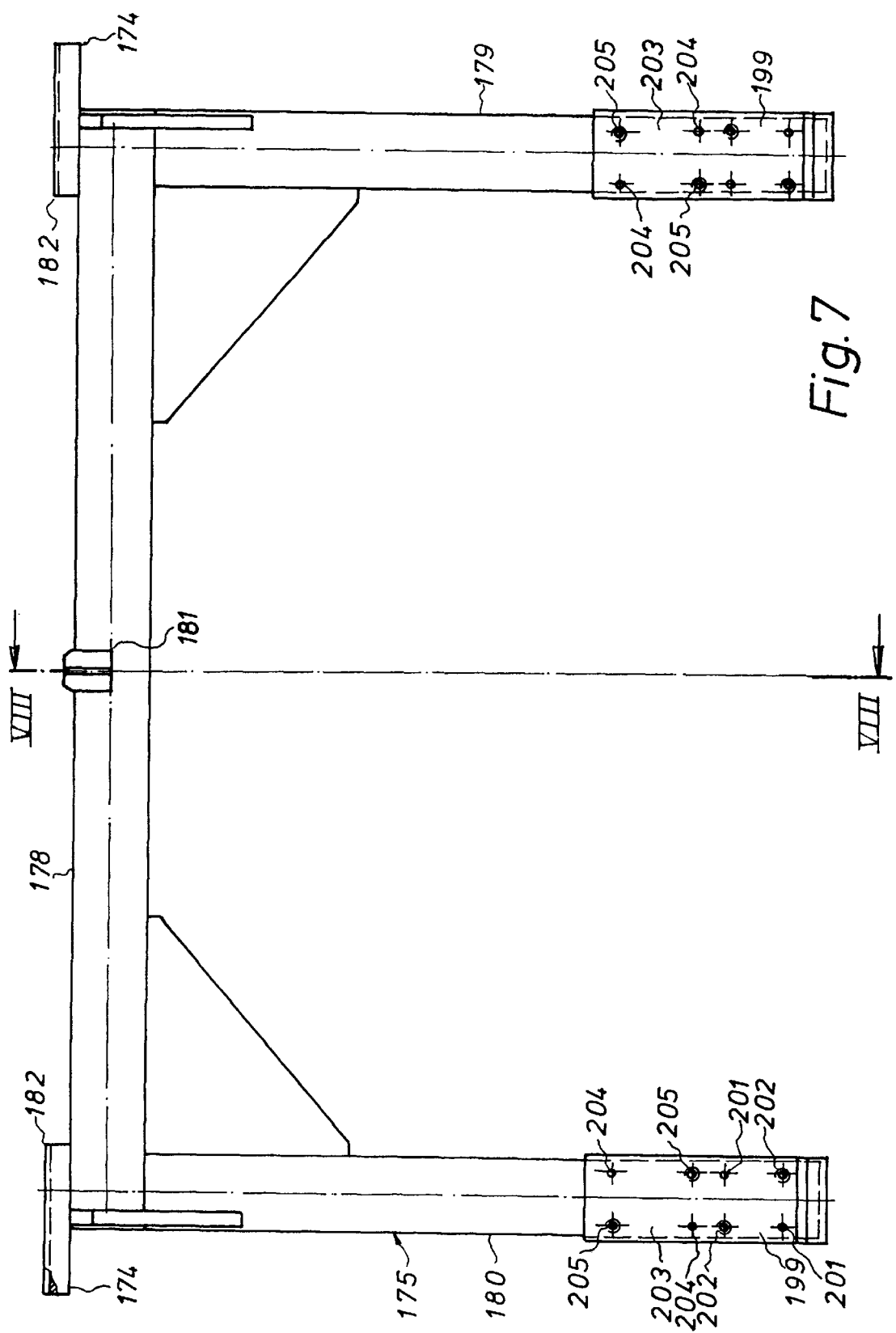

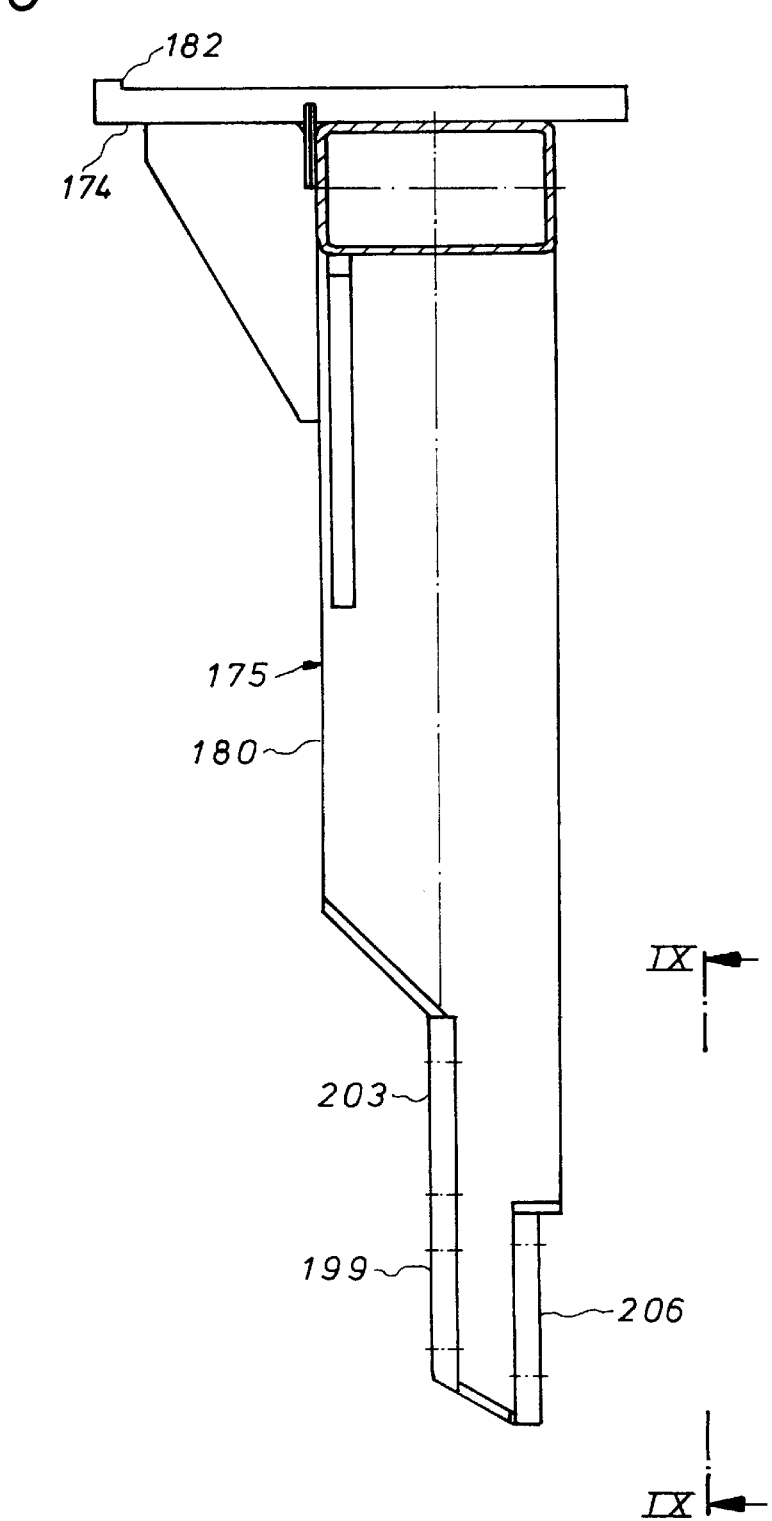

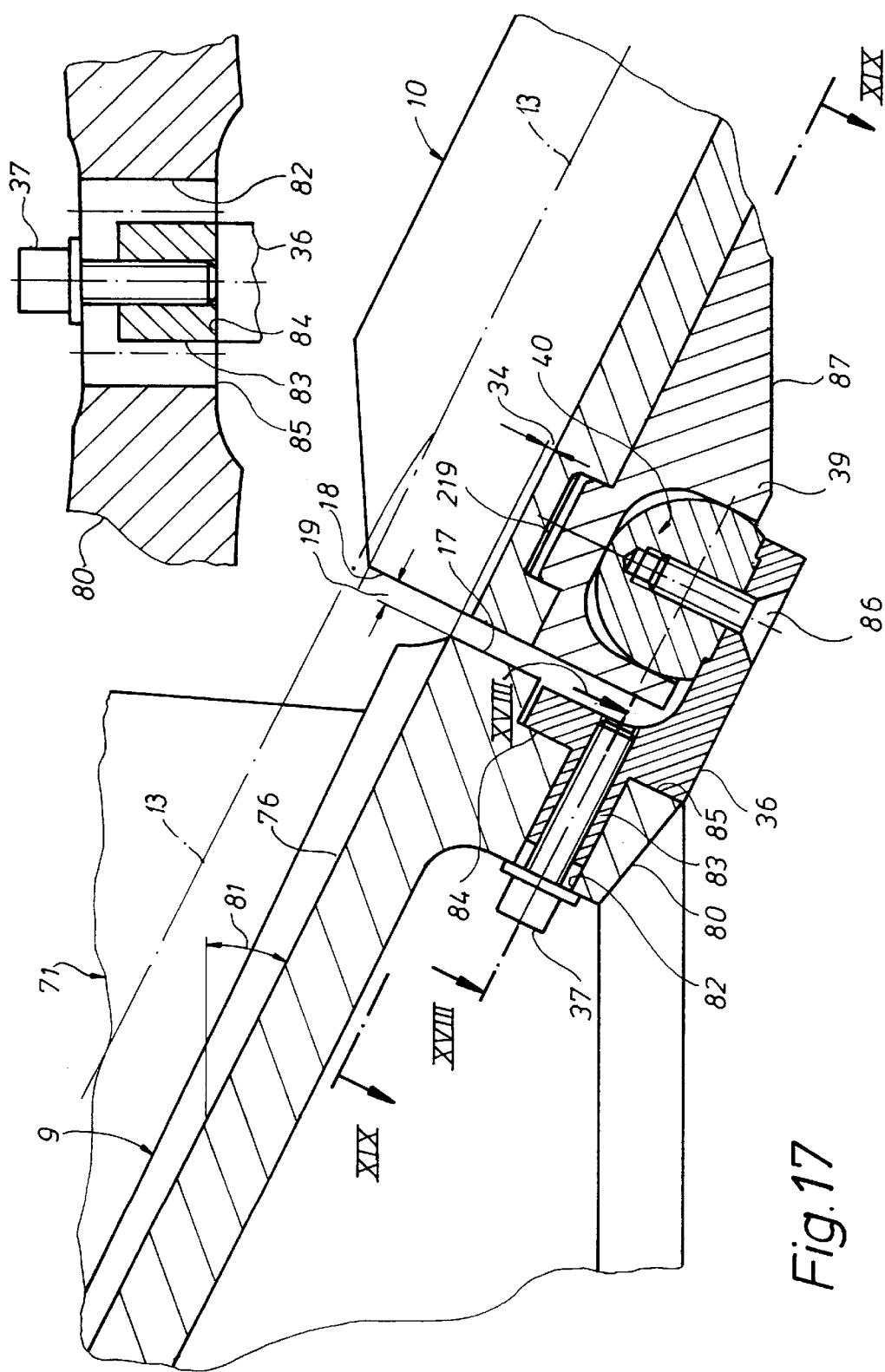

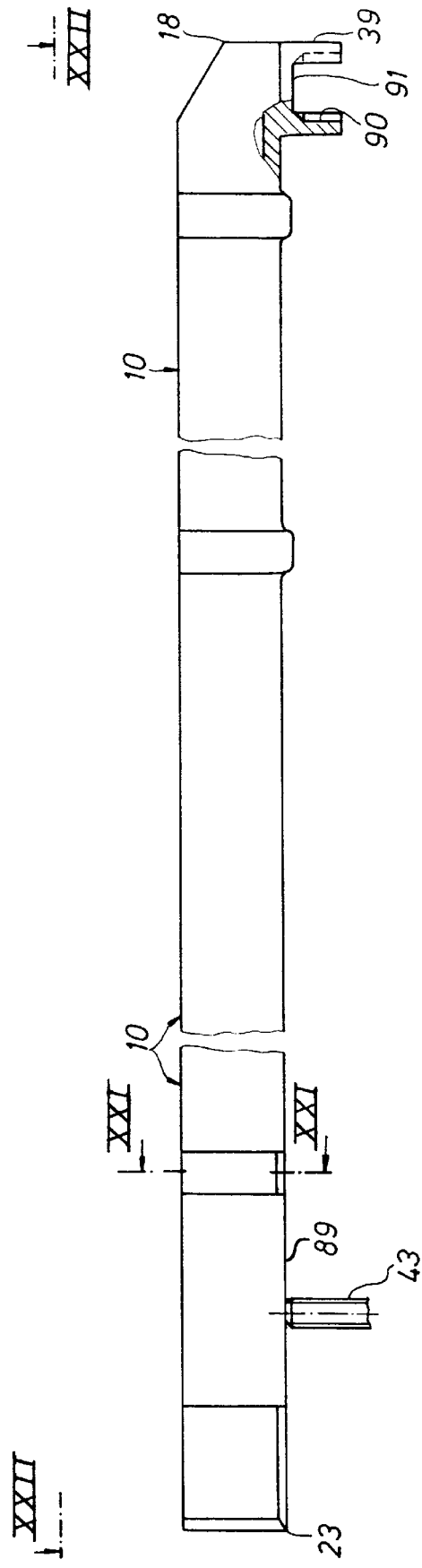

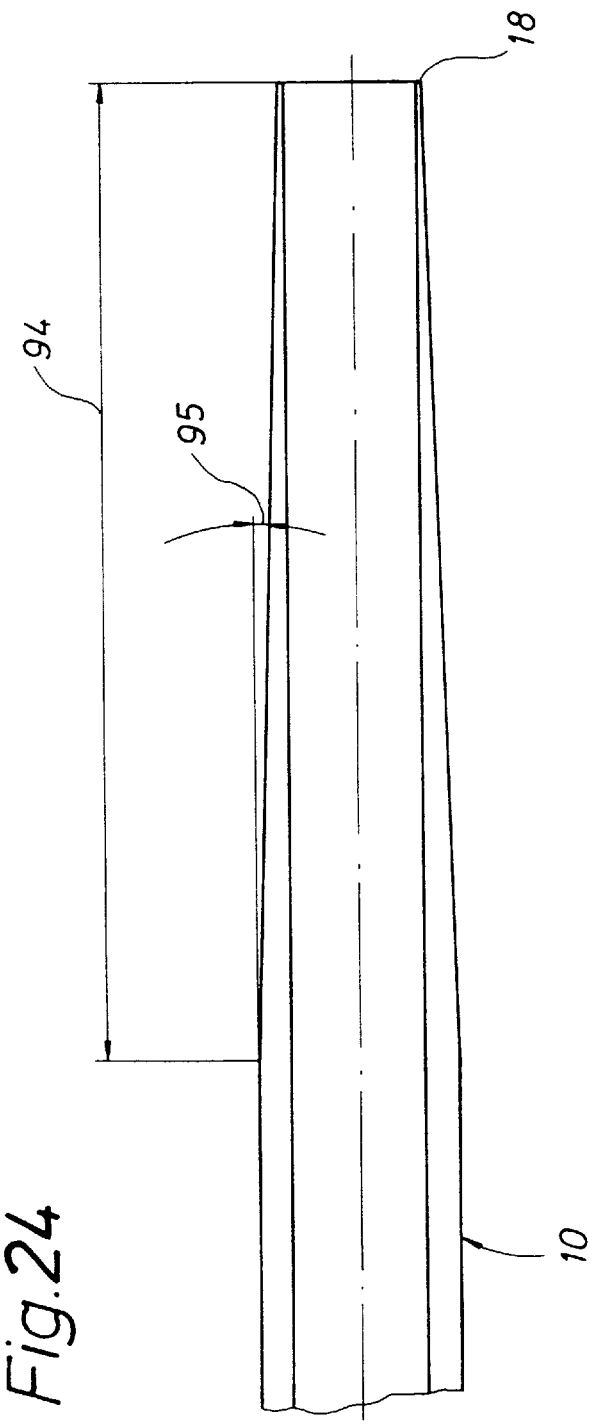

Fig. 26
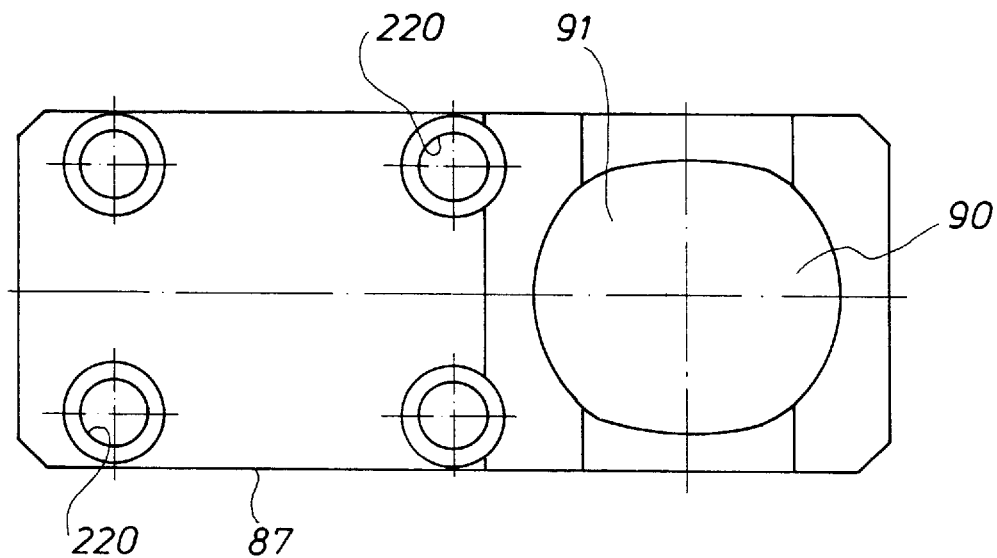
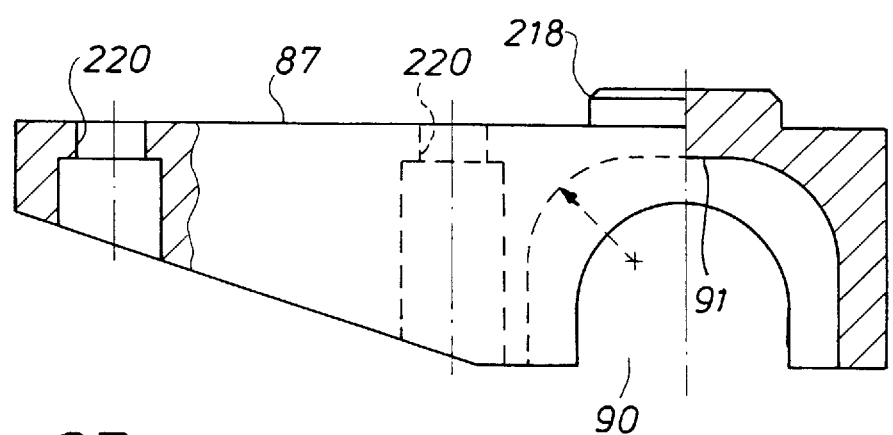
Fig. 25

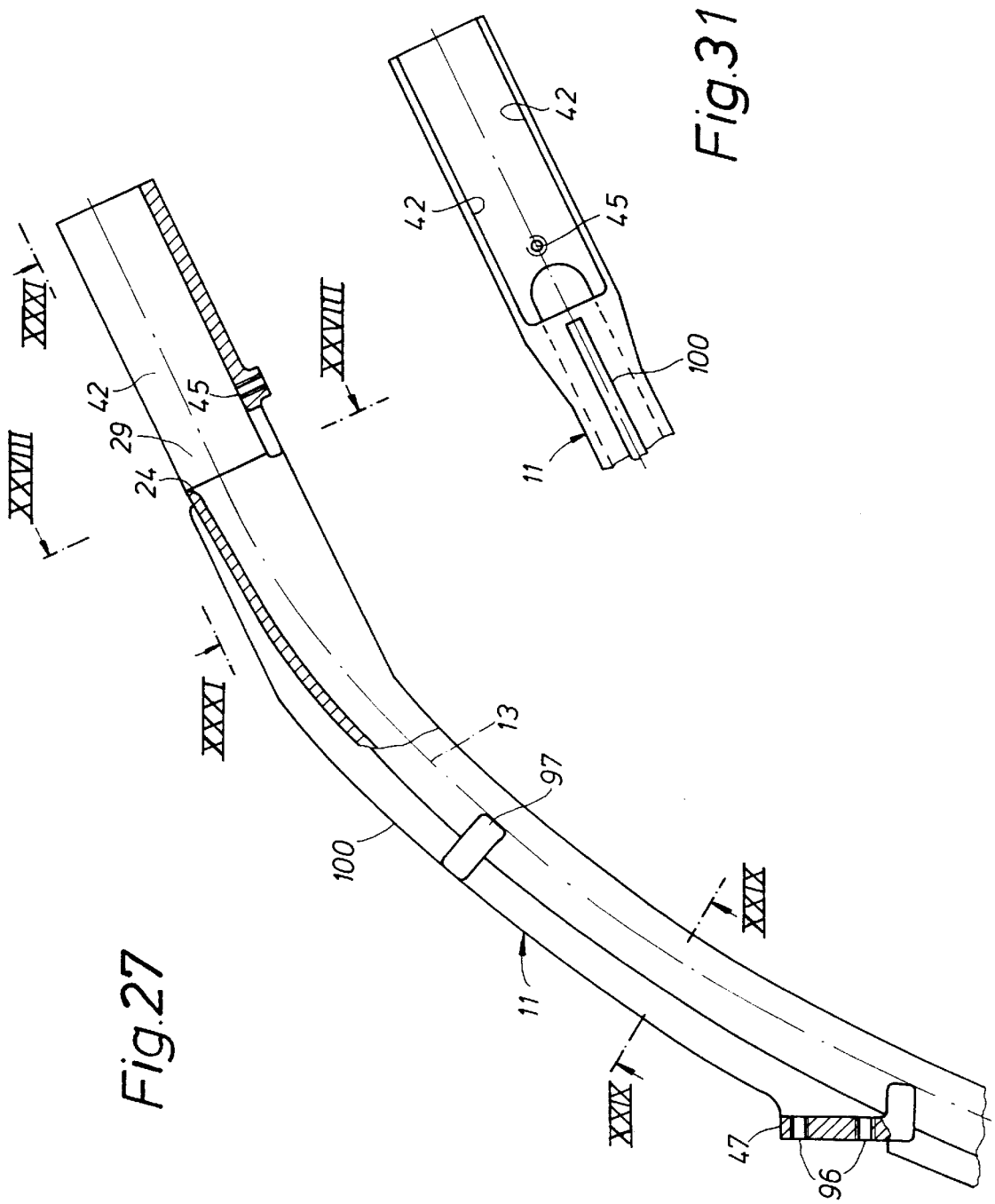

GOB DELIVERY APPARATUS FOR A GLASSWARE FORMING MACHINE

CROSS REFERENCE TO RELATED APPLICATION

The present application is a division of application Ser. No. 08/142,386, filed as PCT/EP92/00432 Feb. 28, 1992, now U.S. Pat. No. 5,599,370.

BACKGROUND OF THE INVENTION

1. Field of the Invention

The present invention relates to a gob delivery apparatus for the transportation of gobs of molten glass from a gob feeder into molds of one or more glassware forming machines. More particularly, the invention pertains to such delivery devices having a curved scoop, a downward sloping trough, and a curved deflector from which the gobs exit into a mold.

2. Description of the Related Art

In the typical glassware forming operation, molten glass gobs move in freefall from a pair of gob shears of the gob feeder into the scoop of the delivery apparatus. The delivery apparatus directs the gobs to a glass mold. In one known gob delivery system of this type, U.S. Pat. No. 1,575,370, a gob distributor comprises an upper scoop portion and a lower scoop portion (page 1, lines 102 and 103), with the scoop portions being swivellable by means of a bearing ring about a vertical axis of a gob outlet. The upper scoop portion is tiltable downwards about a horizontal axis of a standard of the bearing ring in the case of a malfunction, thereby allowing subsequent gobs to freely fall through the bearing ring, a base and a frame into a cullet silo. The lower scoop portion is comparatively long to be able to charge the different troughs with gobs in succession. Consequently, the dwelling time for the gobs in the upper and lower scoop portions is undesirably long, limiting the number of cuts per minute which the shears can perform and consequently limiting the output of the machine.

A very similar gob delivery system is known from DE Auslegeschrift 1024681. There again, an upper scoop portion which can be raised and lowered about a horizontal axis, and a comparatively longer lower scoop portion are provided. It thus has the same disadvantages as remarked upon in the case of U.S. Pat. No. 1,575,370. This publication is not directed to the individual elements of the gob delivery system, but to an overlay on the scoops and on the troughs in order to improve the sliding properties of the gobs in the gob delivery system.

Another known gob delivery system of the type first referred to above is shown by U.S. Pat. No. 1,911,119 where a structure is provided in quadruplicate in order to supply gobs to four sections (FIG. 2) of an I.S. glassware forming machine. Each delivery system (FIGS. 1 and 4) comprises an individual scoop which is movable radially (FIG. 2) from the gob feeder (FIG. 1) with reference to the gob outlet. The upper end of each trough can be raised and lowered about a horizontal pivot shaft (FIG. 1) of a holder which is fixed relative to the machine. The lower end of each trough rests on the setting device of a holder, formed as a setting screw (FIG. 1). The deflector is fixed to the holder at two connecting points. The holder is adjustable in a horizontal plane by means of two setting screws (FIGS. 1 and 2) of the setting device which are arranged at 90° to each other. The disadvantages of this system are the high structural cost for the scoop and their drive mechanisms (FIGS. 2 and 4). Also, each trough is movable only in one vertical plane leading to consequential alignment faults with the deflector upon lateral adjustment movement of the deflector. Another disadvantage is that with increasing numbers of sections of the I.S. glassware forming machine, the troughs would strike upon one another at their upper ends. They therefore would have to be tapered or thinned at the upper end, thus impairing the optimum trough profile. As in the previously described systems, this system also has relatively long scoops. Moreover, the system design does not allow for a shortening of the scoops, since, particularly with a high number of sections for each IS glassware forming machine, the troughs have to be correspondingly lengthened at the top in the direction towards the scoops. This is only possible to a limited extent, since then the upper ends of the troughs come into contact with one another laterally. This applies particularly for those troughs which are associated with the outermost sections of the IS glassware forming machine.

Attempts have been made to overcome this problem by laterally tapering or narrowing the upper ends of the troughs which would otherwise come into contact with each other. By such tapering, however, the already limited wall thickness of the troughs is further reduced. For certain trough profiles, the tapering may even remove the upper part of the trough profile. Both of these modifications to the upper end of the troughs are undesirable.

For gob delivery apparatus which have a small freefall height, the dwell time of the gobs in the scoop is comparatively long because the speed of the gobs is relatively slow. The scoops should be kept comparatively short. In the case of short scoops, the transit time of the gob is minimized, thus allowing for a correspondingly high gob cutting rate.

It is an object of the invention to provide an improved gob delivery apparatus.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention provides an improved glass gob delivery apparatus for delivering gobs of molten glass from a feeder to a mold of a glassware forming machine quickly and with a high degree of accuracy. The invention, in a broad form, comprises a curved scoop that catches the molten glass gobs coming from the gob feeder. Directed downwards at an angle, the gobs then proceed down a trough to a deflector. The deflector deflects the gobs downward into the mold. The lower end of the trough, which delivers the gobs to the deflector, can be raised or lowered by an adjustment device. A setting device, having at least one coupling member carrying the deflector, permits adjustment of the deflector in a plane perpendicular to the longitudinal axis of the mold.

Each coupling member makes possible a relative swivelling movement of coupling member and deflector about an axis parallel to the longitudinal axis of the mold, and is adjustable in a plane perpendicular to the longitudinal axis of the mold. The coupling members can be formed in a particularly advantageous way as receiving pins which permit a rapid and easy assembly and dismantling of the deflectors. The deflector is in each case provided with a complementary coupling member. Additionally, each coupling member can be displaceable lengthwise on a strut in the plane perpendicular to the longitudinal axis of the mold, and the strut can swivel about a first swivel axis which is fixed relative to the machine and which is parallel to the longitudinal axis of the mold. By these means, the deflector can be adjusted in two dimensions accurately to the longitudinal axis of the associated mold. Preferably, the strut is secured to a column which is swivellable about the first swivel axis. Furthermore, each coupling member can be fixed to a threaded sleeve mounted to be longitudinally displaceable on the strut, and an axially fixed first threaded spindle engages in a thread of the threaded sleeve. This achieves a particularly simple and operationally reliable lengthwise displacement for the coupling member. The axial setting of the first threaded spindle can be achieved, for example, on the bracket or on a structural component fixed to the machine. The first threaded spindle can be actuated by hand.

In a further advantageous feature, a nut which is mounted to be swivellable about a second swivel axis is spaced from the first swivel axis in the strut, and an axially fixed second threaded spindle extends transversely to a connecting line between the two swivel axes and engages in a threaded bore in the nut. A simple and operationally reliable swivelling of the strut and consequently of the coupling member is achieved. The axial fixing of the second threaded spindle can be effected, for example, by a structural member fixed relative to the machine. Again, the second threaded spindle can be actuated by hand.

Two spaced, aligned coupling members can also be provided for each deflector. Here, both struts are fixed on a common column swivellable about the first swivel axis, and the two first threaded spindles of the coupling members are connected to one another by a gear means. This leads to a particularly reliable and stable mounting of the deflector. It is of particular advantage that only one of the struts, as a rule the lower strut on account of its better accessibility, is directly drivable for the swivelling movement of the strut, while the other strut is entrained by the common column. The gear means can be formed, for example, as chain drives, with or without chain tensioners, where again only one, preferably the lower one on account of its better accessibility, of the two threaded spindles is directly driven, while the other threaded spindle is entrained in synchronism by the gear means.

A particularly advantageous feature provides that the path of movement of the gob in the deflector is part of a quarter ellipse. At the lower end of the deflector a minor half axis of the quarter ellipse lies horizontal and perpendicular to the path of movement. This leads to a particularly gentle deflection of the gob on to the longitudinal axis of the mold. In its travel through the deflector the gob is maintained in contact with the deflector by centrifugal forces. The magnitude of the centrifugal forces decreases continuously from a maximum value at the upper end of the deflector to a minimum value at the lower end of the deflector. The lower end of the deflector can be selectively equipped with a funnel to improve the centering of the gob, with the funnel finally feeding the gob into the mold. Alternatively, the path of movement of the gobs in the deflector can follow a quarter circle. This is recommended in certain cases for the deflectors of the outermost sections of an I.S. glassware forming machine. They then have essentially the aforementioned advantageous effects on the movement of the gob.

As another alternative, the path of movement of the gobs in the deflector follows initially a part of a quarter circle, and thereafter that of a quarter ellipse. These features can be incorporated in particular in the case of difficult structural conditions in the outermost sections of an I.S. glassware forming machine. In this way one can prevent that with an otherwise unfavorable geometrical configuration of the path of movement of the gob in the deflector the gob after its exit from the accurately aligned deflector receives a rotary impulse about a transverse axis and additionally is projected beyond the center of the mold. Such deviations from the ideal gob path lead to unsatisfactory charging of the mold. The configuration of the path of movement as described helps to avoid this. Further advantages can be obtained wherein the quarter circle approaches the quarter ellipse from the outside of the quarter ellipse. This is recommended if the major half axis of the quarter ellipse is vertical.

By merging the path of the gob in the trough with the path of movement of the gob in the deflector, the gobs are protected as far as possible also at the transition point from the trough into the deflector and are transferred to the deflector as far as possible without shocks.

Further advantages are provided by a slide member which directs the gobs between the scoop and the trough. All sections of the I.S. glassware forming machine preferably use only one scoop which, as is shown for example in U.S. Pat. No. 3,775,083, is swivellable about the vertical axis of the associated gob outlet. Preferably, in addition, the slope of all the troughs relative to the horizontal is the same. By means of the adjustment device, coaxiality of the longitudinal axes of the gobs and of the mold can be achieved, with the result that the molding operation is made easier and improved. Generally, the gobs move in freefall from a gob shears of the gob feeder into the scoop. When, in the case of a small freefall height, the dwell time of the gobs in the scoop is comparatively long since then the speed of movement of the gobs is comparatively small, the scoops can be kept comparatively short. The horizontal extent of the scoops can amount, for example, to 200 mm from the longitudinal axis of the gob outlet of the gob feeder as far as the lower end of the scoop. In the case of such short scoops the transit time of the gob is kept to a minimum under all circumstances and a correspondingly high cutting rate for the gobs can be achieved.

According to another aspect of the invention, the basically disadvantageous narrowing of the upper ends of the troughs can either be completely avoided or can be limited to an acceptable degree. This is achieved by approaching the upper ends of the troughs to the scoops only to that extent which is tolerable in view of an uncritical narrowing of the troughs. With simultaneous shortening of the previously known scoops there results from this a relatively large gap between the scoop and the upper ends of the troughs. This gap is bridged according to the invention by the stationary slide members. From this one achieves considerable advantages on the one hand on the basis of the shortened scoop and on the other hand by the upper ends of the troughs having no or only a small amount of narrowing. Preferably, the scoop is made of stainless steel and the slide members and respectively the slide unit, the troughs and the deflectors are made from cast iron.

Further advantages are obtained where all slide members of the glass forming machine associated with a particular scoop are connected to form a slide unit. This slide unit is simple to make from a technical point of view and is particularly simple to mount and set. This applies particularly for I.S. glassware forming machines. The slide unit can be connected to a holding device which is mounted fixed relative to the machine. This considerably facilitates the mounting of the slide unit. The holding device can, for example, be releasably pinned and screwed to the scoop beam of an I.S. glassware forming machine. In a similar manner the slide unit can be, for example, releasably pinned and screwed to the holding device. Consequently, the slide unit can be mounted with very high accuracy on the holding device first and then the holding device itself can be fitted with the same high degree of accuracy to the rest of the machine. A construction of the holding device which is very stable and gives sufficient space for working adjustments of the slide unit is substantially U-shaped with two free arms. Each arm has at least one slide unit arranged between the arms.

Additional advantages are obtained with a setting gauge that is connectible to the holding device which is mounted fixed relative to the machine. The gob feeder has at least one scoop adjustable relative to the setting gauge and mountable fixedly to the machine. This makes it possible with simple means to achieve a very accurate adjustment of the gob distributor and consequently of the scoops relative to the rest of the machine. The gob distributor is preferably mounted on the scoop beam of an I.S. glassware forming machine. A simple and particularly rapid and accurate adjustment of the gob distributor can be obtained where the setting gauge has at least one matched borehole, and at least one centering pin which is concentric with an inlet aperture of a scoop is centered in the associated matched borehole when the adjustment of the gob distributor has been completed. With a scoop swivellable about a vertical axis, the centering pin is preferably concentric with respect to the swivel axis of the scoop.

Slide channels can be provided to improve the guidance of the gobs slide over the slide member and to improve their centering in relation to the inlet of the subsequent trough. The slide channels are provided in the upper surface of each slide member. By providing linear slide channels, the objects of guiding and centering the gobs are particularly well achieved.

A gap between the scoop and the slide member, and a gap between the slide member and the associated trough can be particularly advantageous. The gaps are jumped by the gobs in free flight. These gaps leave sufficient play for relative adjustment and setting of the adjacent elements of the gob delivery system. The size of the upper gap can be, for example, 60 mm, while the lower gap may be, for example, 5 mm.

Another advantageous feature includes a step perpendicular to the path of the gobs at a lower end of the scoop relative to the slide member and a step at the lower end of the slide member relative to the trough. The upper step can be, for example, 4 to 5 mm and the lower step 1 to 1.5 mm. The steps have the result that the gobs at the end of the respective free flights undergo an impact angle of about 5° on the one hand against the slide member and on the other hand against the trough. These small impact angles lead to correspondingly small effects on the gob shape. On the other hand, by means of the steps the travel of the gobs is made more reliable overall. This applies particularly in the initial operating phase of a glassware forming machine where the operating parameters have not yet reached equilibrium.

A further advantageous feature, the internal surface of the scoop has at the top a downwardly narrowing, tapered funnel region which is contacted first by the gobs and at the bottom of the funnel region there is tangential transition to a particular region of the internal surface of the scoop. The gobs come into contact with the scoop under the same conditions for each swivel position of the scoop. This leads to correspondingly regular gob travel from the scoop through the remaining elements of the delivery systems. In another embodiment of the delivery apparatus, each trough at its upper end is mounted fixed relative to the machine with a universal joint. Here the troughs are mounted so as to be universally movable at their upper ends. Furthermore, the lower end of each trough can be extended into a vertical chute at the upper end of the associated deflector with freedom for vertical movement and security against rotation about its longitudinal axis. This leads to a particularly unrestrained holding of the troughs. By comparatively narrow matching between the vertical chute and the trough one ensures that trough and chute are each located in substantially a common vertical plane. This results in an unhindered travel of gobs through these trough members in a very good manner. The structure of the universal joint can include a ball cage on the trough which engages with a ball member supported fixed relative to the machine. This is very simple and yet nevertheless very reliable functionally. Preferably, the ball cage is located on the underside of the trough and the ball cage is only loosely mounted on the ball member. By this means the assembly and the dismantling of the trough can be achieved without adversely affecting the operating reliability. The ball cage can alternatively be formed as part of a separate component which is connected releasably to the trough, for example, by bolts.

By locating the ball member on a carrier member, and where each carrier member is supported on the associated slide member, a particularly accurate association of the trough with the slide member is possible with a particularly small relative gap and particularly small step. Furthermore, each carrier member can be adjustable relative to the associated slide member, thereby allowing adjustment with any degree of accuracy. One can achieve a height adjustment of the lower end of the trough relative to the upper end of the deflector in a particularly simple manner where the adjustment device has an adjusting screw carried by the deflector, and wherein this screw extends from below up into the vertical chute, and the lower end of the trough rests upon the adjusting screw.

The advantages of the invention can be utilized with multiple gob or multiple mold operation by providing a number of elements corresponding to the number of gobs fed into the glassware forming machine at approximately the same time.

DESCRIPTION OF THE DRAWINGS

The operation, features and advantages of the invention will be apparent from the following description of certain embodiments of the invention which are given by way of example and which are shown in the drawings. In the drawings:

FIG. 7 is the plan view of the holding device shown in FIG. 6;

FIG. 8 is the sectional view taken along the line VIII—VIII in FIG. 7;

FIG. 9 is the view taken along the line IX—IX in FIG. 8;

FIG. 17 is the sectional view taken along the line XVII—XVII in FIG. 13 with additional built-on elements;

FIG. 18 is the sectional view taken along the line XVIII—XVIII in FIG. 17;

FIG. 20 is a side view, partly broken away, of a part of one embodiment of a trough;

FIG. 24 is a plan view corresponding to that of FIG. 22 of the upper end of a reduced trough;

FIG. 25 is a side view, partly in section, of a separate component for another embodiment of the trough;

FIG. 26 is the view taken along the line XXVI—XXVI in FIG. 25;

FIG. 27 is a side view of the upper part of a deflector of the delivery system;

FIG. 31 is the view taken along the line XXXI—XXXI in FIG. 27;

DETAILED DESCRIPTION OF THE INVENTION

Figure 1:
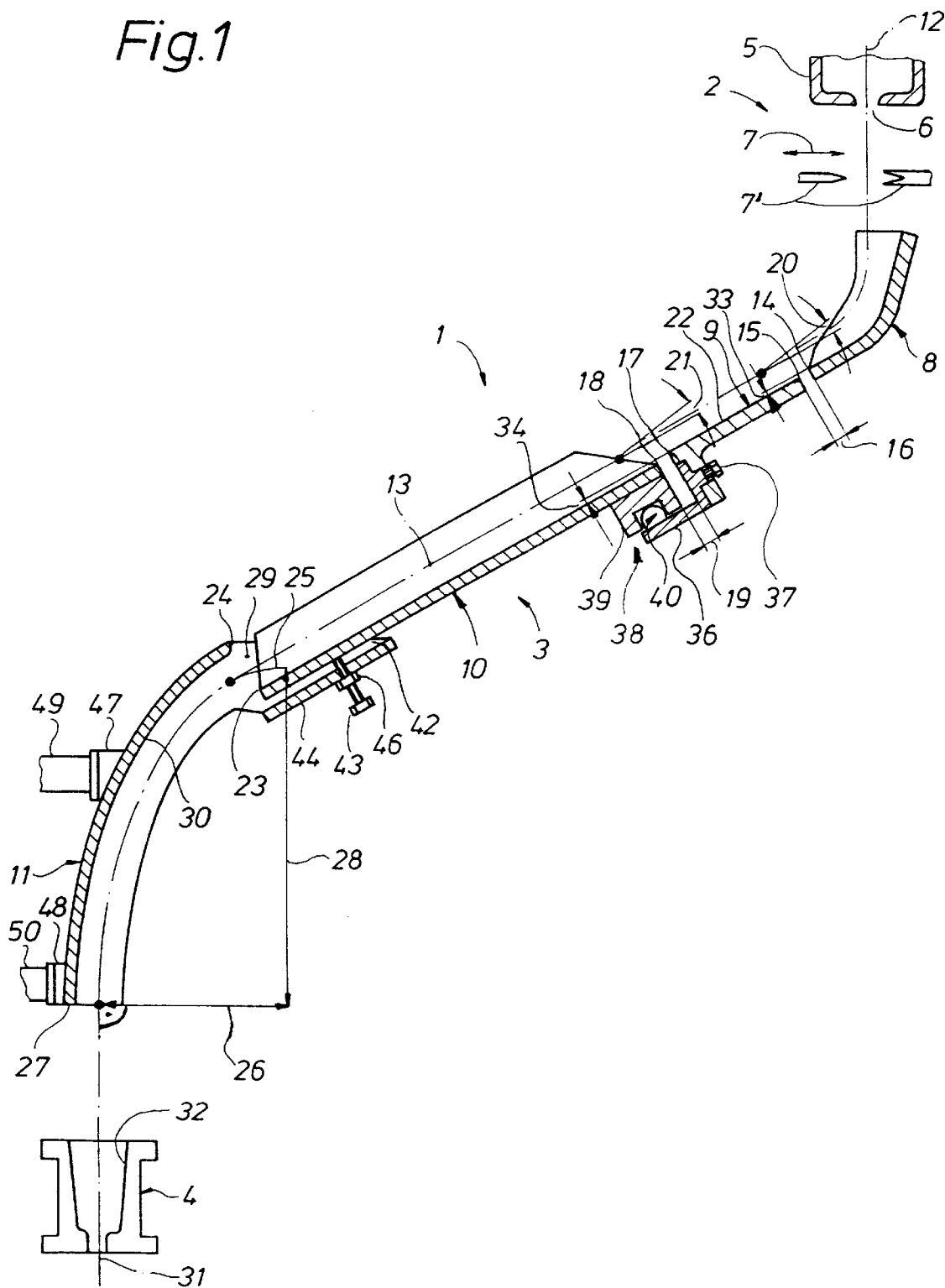
FIG. 1 is a schematic side view of a delivery system for single-gob operation.

The present invention provides improved apparatus and process for delivery of molten gobs of glass to molds of an I.S. (individual section) press and blow type glassware forming machine. FIG. 1 schematically shows a gob delivery apparatus 1 for the transfer of gobs of molten glass from a gob feeder 2 through a delivery system 3 into a mold 4, particularly a parison mold of an I.S. glassware forming machine which is not further shown.

The gob feeder 2 comprises, in a manner known per se, a feeder head 5 from whose gob outlet 6 exits a strand of molten glass from which gobs are periodically cut by a shears 7' movable in the direction of the double headed arrow 7.

The delivery system 3 comprises a scoop 8, a slide member 9, a trough 10 and a deflector 11.

The scoop 8 is in this case pivotable in a manner known per se and which is not shown here in greater detail about a longitudinal axis 12 of the gob outlet 6. The scoop 8 catches all the gobs severed by the shears 7' and conducts them, according to its pivoted position, onwards to the rest of the respective following delivery system 3.

Each gob travels through the delivery system 3 with its longitudinal axis travelling along a path of movement 13 which is marked by a chain-dotted line in FIG. 1. The scoop 8 is curved and deflects the gob downwards at an angle. Between a lower end 14 of the scoop 8 and an upper end 15 of the slide member 9 there is a first gap 16 of, for example, 65 mm. In a similar manner, between a lower end 17 of the slide member 9 and an upper end 18 of the trough 10 there is a second gap 19 of, for example, 5 mm. As the path of movement 13 indicates, the gobs pass over the gaps 16 and 19 in free flow and impinge at a comparatively shallow angle of incidence 20 and 21 first on a downwardly inclined upper slide surface 22 of the slide member 9 and then onto the similarly downwardly inclined trough 10. The trough 10 is rectilinear and delivers its gobs at its lower end 23 to an upper end 24 of the deflector 11. Within the deflector 11 the path of movement 13 follows the track of the lower part of a quarter of an ellipse 25. The minor axis half 26 of the quarter of the ellipse 25 is perpendicular to the path of movement 13 at a lower end 27 of the deflector 11. In FIG. 1 the vertical major axis half 28 of the quarter of the ellipse 25 is also indicated.

Between the lower end 23 and the upper end 24 there is again a gap 29 which is traversed by the gob in free flow until it comes into contact with a slide face 30 of the deflector 11 and is deflected by this downwards coaxially in relation to a longitudinal axis 31 of the mold 4. The gobs drop from the lower end 27 of the deflector 11 in free fall into a mold recess 32 of the mold 4.

By means of the design of the delivery system 3 according to the invention one achieves an optimum gob travel which leads to a gob shape which is easily reproducible.

The angles of incidence 20, 21 are generated in that on the one hand the lower end 14 of the scoop 8 is at a first stepped height 33 above the upper end 15 of the slide member 9 perpendicular to the path of movement 13, and on the other hand the lower end 17 of the slide member 9 has a second stepped height 34 above the upper end 18 of the trough 10 perpendicular to the path of movement 13. The stepped heights 33, 34 are chosen to be only sufficiently large that one reliably avoids any impact of the gobs against the upper ends 15 and 18 under any circumstances at all.

The slide member 9 is supported fixedly on the machine in a manner to be described hereinafter.

Each trough 10 is connected by means of a universal joint 38 to its associated slide member 9. The universal joint comprises a ball cage 39 secured to the underside of the trough 10 and which engages over a ball member 40 which is held fast by a carrier member 36. The carrier member 36 is held in place by means of a screw 37 so as to be adjustable relative to the associated slide member 9.

The lower end 23 of the trough 10 extends into a vertical chute 42 at the upper end 24 of the associated deflector 11 with freedom for vertical movement and with prevention against rotation about its longitudinal axis. An adjustment device 43 is provided in the form of a setting screw which is screwed into a threaded bore 45 (FIG. 27) of a carrier 44 and which is held in place by a lock nut 46. The lower end 23 of the trough 10 rests on the adjustment device 43 so that the trough can be raised and lowered about a horizontal axis defined by the ball member 40.

On brackets 47 and 48 on the outside of the deflector 11 are mounted horizontally extending support arms 49 and 50 whose function will be explained later.

The path of movement 13 is so designed in each case by relative adjustment of the individual elements of the delivery system 3 that undesirable jerky forces on the gob are avoided. Thus, in the transition from the scoop 8 to the slide member 9 and from the slide member 9 to the trough 10 one takes care in particular to have an optimum step-down height 33, 34, so that the angles of incidence 20, 21 are the optimum and the gobs are not undesirably grossly deformed after their respective free flights. In the same way one must take care that the portion of the path of movement 13 in the region of the trough 10 is tangential to the quarter of the ellipse 25, so that here also the gobs are not subjected to jerky forces.

In all the Figures of the drawings the same components are shown by the respective same reference numerals.

Figure 2:
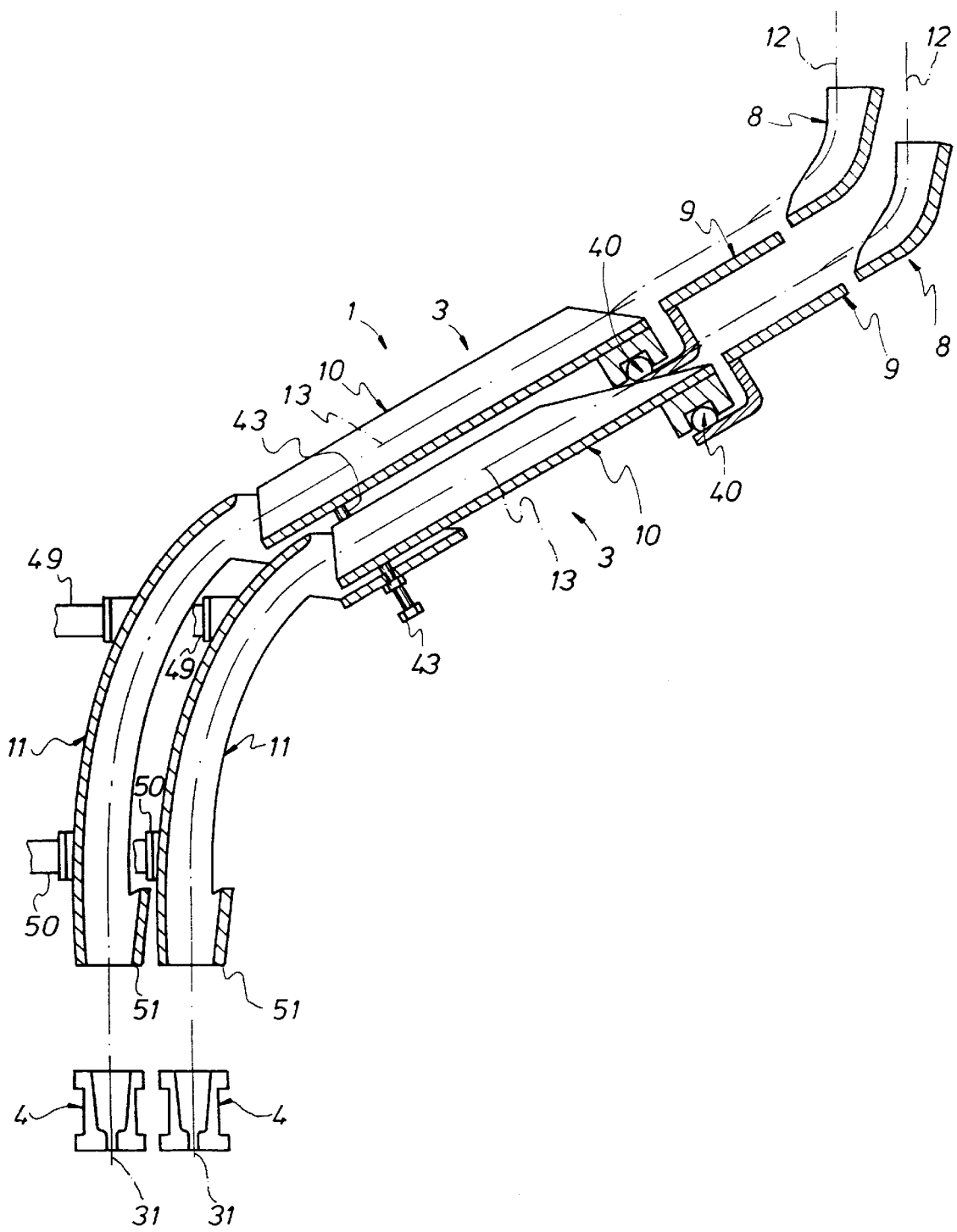
FIG. 2 is a schematic side view of two delivery systems for double-gob operation.

FIG. 2 shows a delivery system 1 for double-gob operation, in which two gobs travelling along the two longitudinal axes 12 drop substantially simultaneously into the associated scoops 8 and then are guided through the rest of the associated delivery system 3 into the respective molds 4. The two delivery systems 3 are arranged so as to be essentially stacked one above the other. It is particularly to be noted that at the lower end of each of the deflectors 11, 11 there is a funnel 51 which serves to ensure the centering of the gob on the longitudinal axis 31 of the mold 4.

Figure 3:
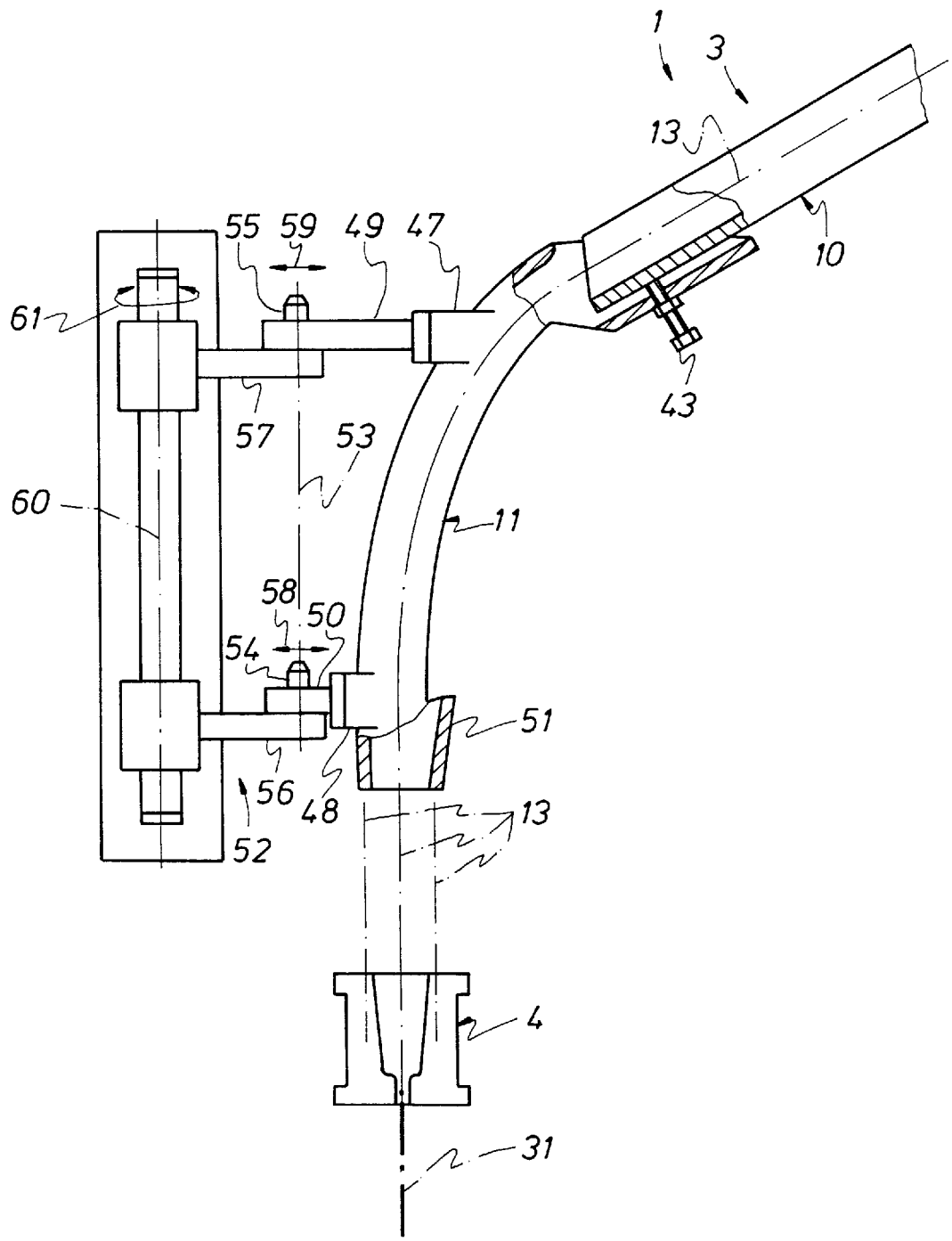
FIG. 3 shows the lower portion of the slightly altered delivery system according to FIG. 1 with associated adjustment device.

In FIG. 3 is shown an setting device 52 by means of which the deflector 11 can be adjusted in a plane perpendicular to the longitudinal axis 31 of the mold 4. The setting device 52 is shown schematically in FIG. 3. The setting device 52 comprises two coupling pieces 54 and 55 for the deflector 11 which are formed as receiving pins which are in alignment with each other on a vertical axis 53. The support arms 49, 50 are respectively mounted to be freely rotatable on the coupling pieces 55, 54 by means of respective bearing holes. Each coupling piece 54, 55 is longitudinally displaceable on a strut 56, 57 as indicated by the double-headed arrows 58, 59 in the plane perpendicular to the longitudinal axis 31 of the mold 4. Moreover, each strut 56, 57 is swivellable back and forth about a first swivel axis 60, as indicated by the double-headed arrow 61, with the axis 60 being fixed relative to the machine and parallel to the longitudinal axis 31 of the mold 4. The details of this will be described hereinafter. In each case, by means of the setting device 52, one can achieve the result that the vertical end portion of the path of movement 13, as is indicated in FIG. 3 by three different chain-dotted lines, is coaxial with or parallel to the longitudinal axis 31 of the mold 4. This is so because the setting means allows for movement of the deflector in infinite direction in the plane perpendicular to the longitudinal axis of the mold, i.e., the deflector can be moved any direction in that plane.

Figure 4:
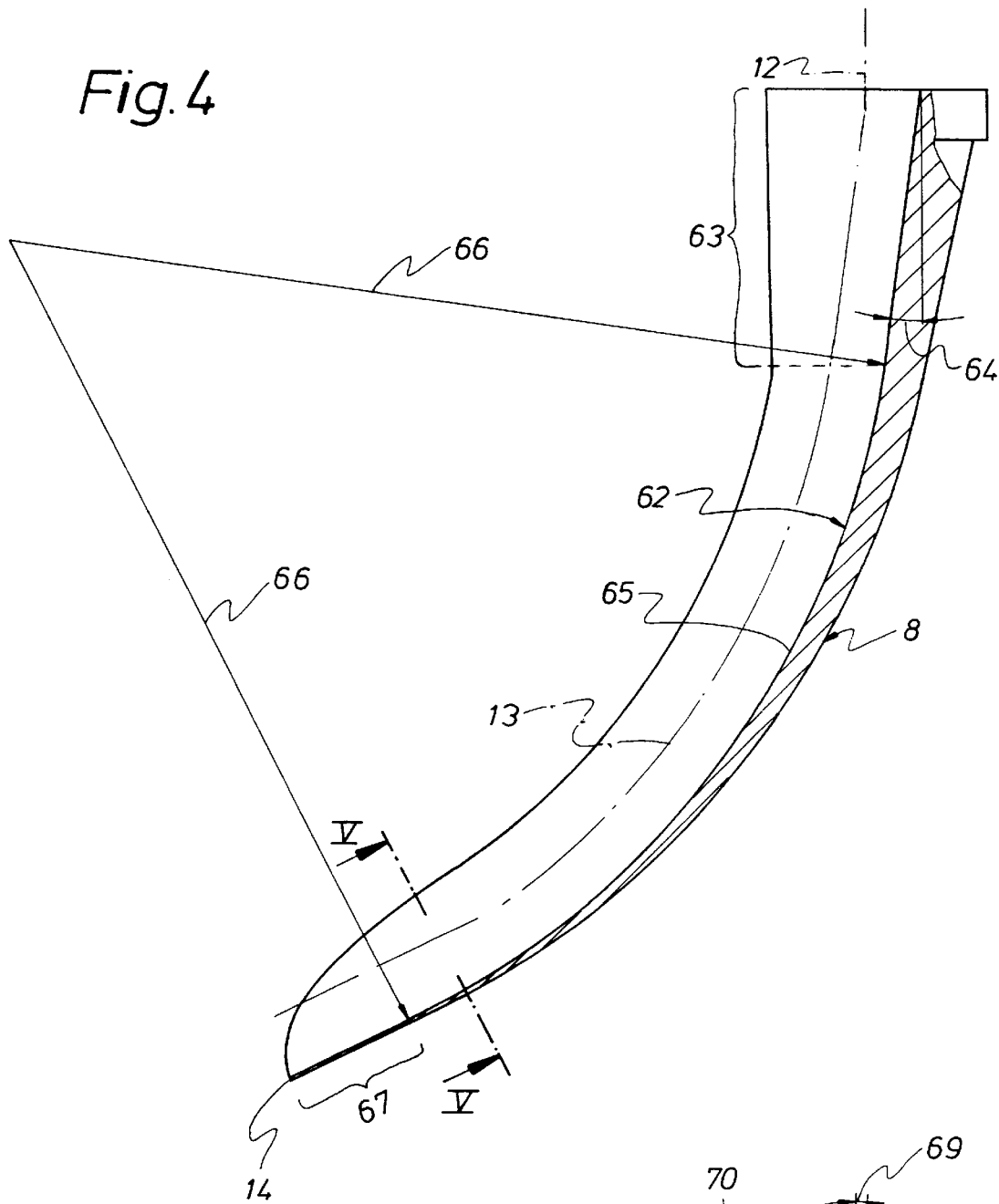
FIG. 4 is a longitudinal section through the scoop according to FIGS. 1 and 2, on an enlarged scale.

As shown in FIG. 4, an internal surface 62 of the scoop 8 has at the top a funnel zone 63 which is tapered and narrows in the downward direction and which is contacted initially by the gobs. The funnel zone 63 has a cone angle 64 relative to the vertical. Below the funnel zone 63 the internal surface 62 continues with tangential transition to a part-circular zone 65 of the internal surface 62 having a radius 66. Following on from the part-circular zone 65 it can be seen from FIG. 4 that there is a tangentially extending linear zone 67 of the internal surface 62 which extends as far as the lower end 14 of the scoop 8.

Within the region of the scoop 8 the path of movement 13 essentially follows the internal surface 62, starting from the longitudinal axis 12 of the gob outlet 6 (FIG. 1).

Figure 5:
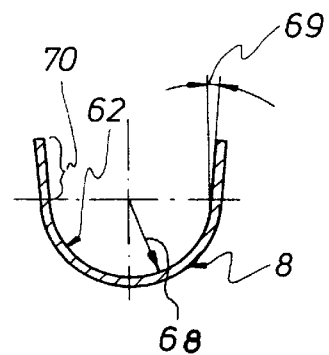
FIG. 5 is the sectional view taken along the line V—V in FIG. 4.

FIG. 5 shows a cross-section through the scoop 8. The internal surface 62 is semi-circular in shape at the bottom with a radius 68, while above this semi-circular profile there are side wall regions 70 which are tangential to the semi-circular profile and which extend upwards and outwards at an angle 69.

Figure 6:
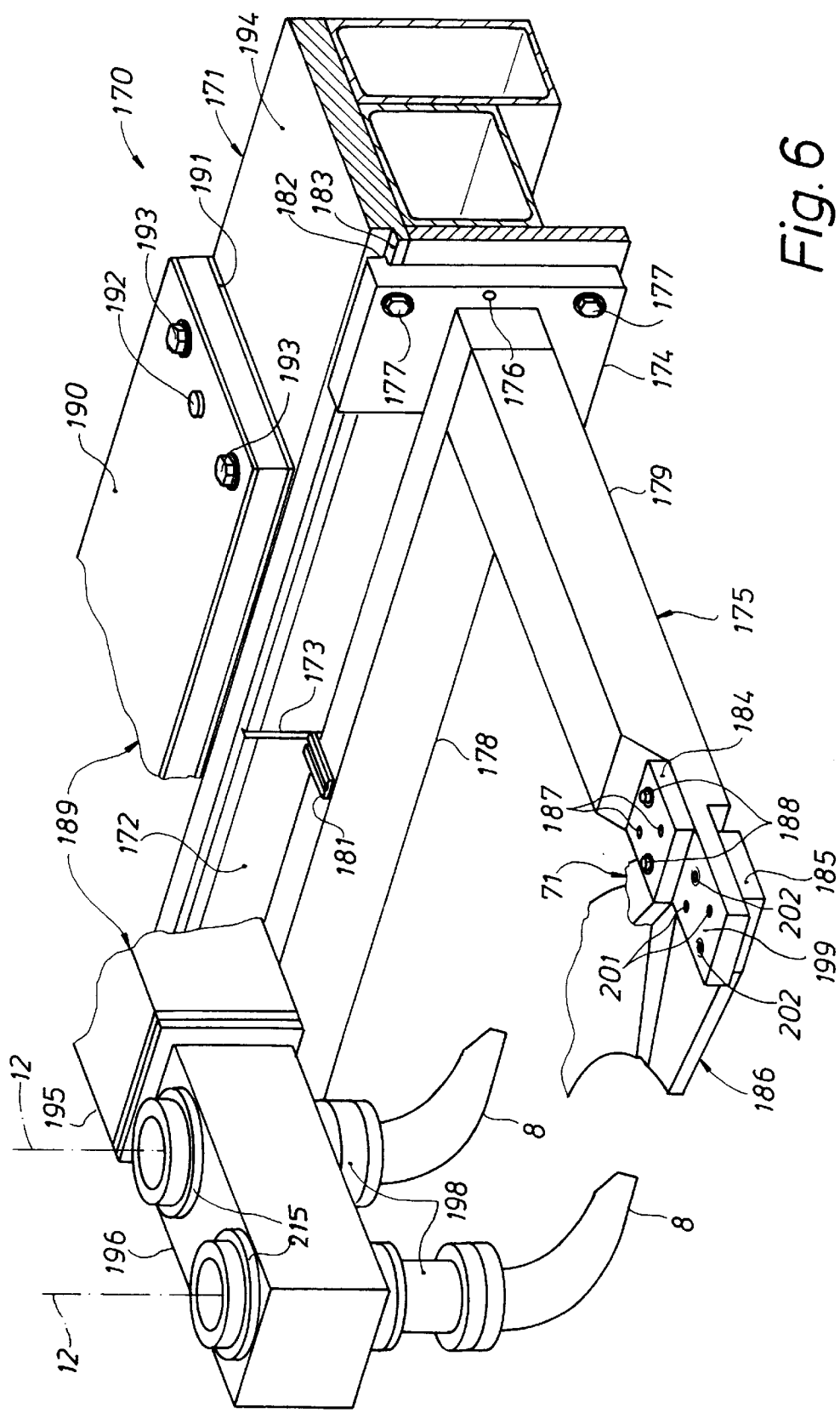
FIG. 6 is a schematic perspective view of a scoop beam with built-on gob distributor and holding device for slide units.

FIG. 6 shows a part of an I.S. glassware forming machine 170 whose framework comprises a scoop beam 171 resting on lateral supports which are not shown. A front face 172 of the scoop beam 171 carries a vertical central marking 173, preferably in a central plane of the I.S. glassware forming machine 170.

Mounting plates 174 of a holding device 175, which are laterally spaced from each other, are centered on the front face 172 by means of centering pins 176 and are secured in place by bolts 177. The holding device 175 is substantially U-shaped in plan and comprises a base 178 which is fixed to the mounting plates 174 and arms 179 and 180 (FIG. 7) which extend forward from the base 178. On the top of the base 178 is fixed a horizontally extending central marker 181 which again is preferably arranged in the central plane of the I.S. glassware forming machine 170.

The mounting plates 174 are suspended at the top by respective hooks 182 which rest on a slide rail 183 on the front face 172. The holding device 175 can therefore be displaced laterally with its mounting so that the central marker 181 is in alignment with the central marking 173 which is fixed on the machine. In this position the centering pins 176 are then fitted before the bolts 177 are tightened up. In this manner the holding device 175 is very accurately centered relative to the scoop beam 171.

Mounting blocks 184 and 185 for an upper slide unit 71 and a lower slide unit 186 respectively are fixed at the free ends of the arms 179, 180 by means of set pins 187 and bolts 188. Details of the slide unit 71 will be given later. The I.S. glassware forming machine 170 is designed for double gob use corresponding to FIG. 2 and consequently has two scoops 8, 8 on one gob distributor 189. The right-hand scoop 8 shown in FIG. 6 conducts the gobs of molten glass to the upper slide unit 71, while the left-hand scoop 8 in FIG. 6 conducts the gobs to the lower slide unit 186.

The gob distributor 189 comprises a base plate 190 which is secured through the intermediary of an intermediate plate 191 to an upper face 194 of the scoop beam 171 by means of set pins 192 and bolts 193. The intermediate plate 191 serves to enable one to adjust the height position of the gob distributor 189.

The gob distributor 189 also includes an extension arm 195 and a head 196 fitted at the front end of the extension arm.

Figure 12:
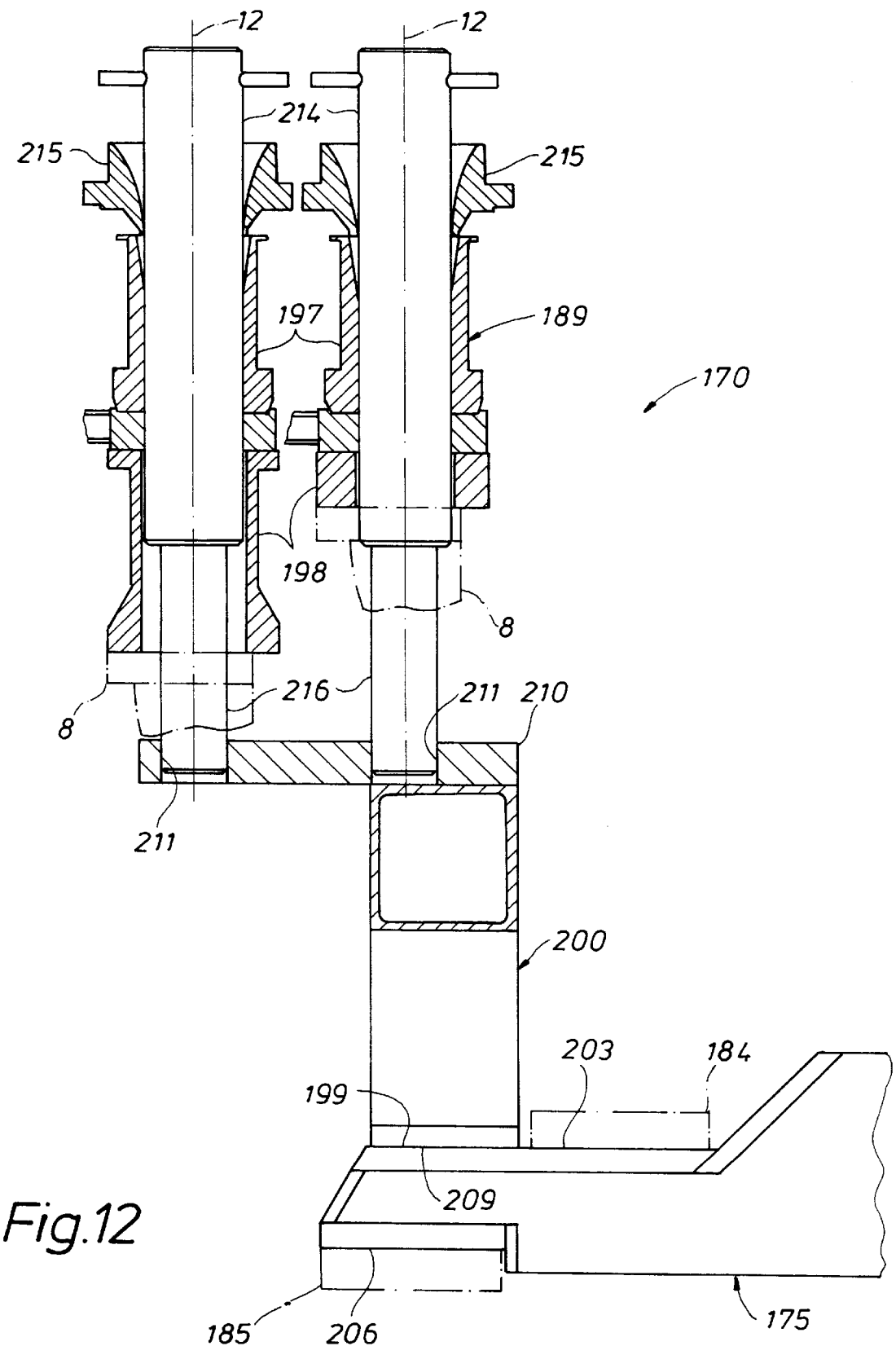
FIG. 12 is the side view taken along the line XII—XII in FIG. 11 with additional adjacent elements.

Rotary sleeves 197 are rotatably mounted (FIG. 12) in the head 196, in alignment with the longitudinal axes 12 (see also FIGS. 2 and 12). These rotary sleeves 197 can be driven in a stepwise oscillatory way in a manner known per se, so that the scoops 8, 8 can supply the following associated remainder of the delivery system 3 (FIG. 2) with gobs of molten glass. An inlet funnel 215 is fixed to the head 196 above each rotary sleeve 197.

The rotary sleeves 197 (FIG. 12) carry at the bottom intermediate tubes 198 of different lengths, so that, as shown in FIG. 6, the left-hand scoop 8 extends down lower than the right-hand scoop 8. These scoops 8, 8 are each releasably mounted on the lower end of the respective intermediate tubes 198.

Figure 10:
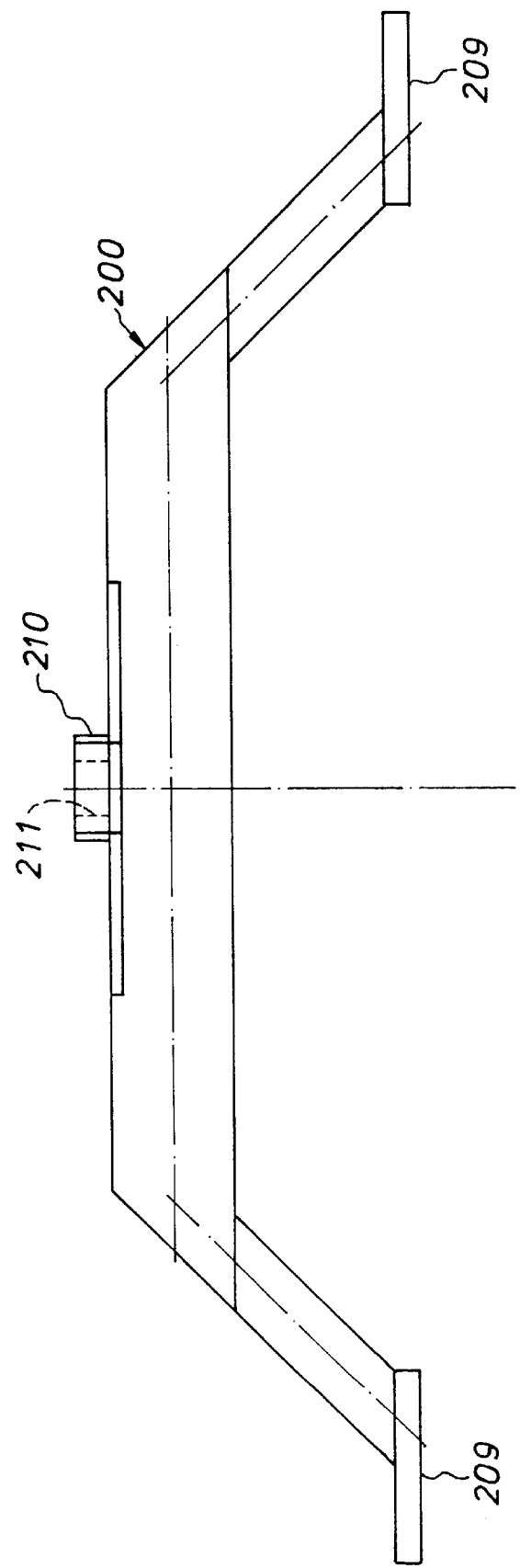
FIG. 10 is a side view of a setting gauge for the setting up of the gob distributor of FIG. 6.

Each arm 179, 180 includes, at the top and extending outwardly, a mounting surface 199 for a setting gauge 200 (FIG. 10). In the mounting surface 199 are provided matched boreholes 201 for set pins and threaded bores 202 for fastening bolts, by means of which the setting gauge 200 can be releasably fastened to the arms 179, 180.

FIG. 7 shows details of the holding device 175. On the mounting surfaces 199, 199 there are respective mounting surfaces 203 with matched boreholes 204 for the set pins 187 (FIG. 6) and threaded bores 205 for the bolts 188 (FIG. 6).

As shown in FIG. 8, a mounting surface 206 for the mounting piece 185 (FIG. 6) is provided underneath the mounting surface 199 on the arm 180 (and in the same manner also on the arm 179).

FIG. 9 makes it clear that matched boreholes 207 for set pins and threaded bores 208 for bolts are provided in the mounting surface 206, by means of which the mounting piece 185 can respectively be releasably secured to its arms 179, 180.

The setting gauge 200 is shown in side view in FIG. 10. The setting gauge is formed essentially as an arch and includes mounting surfaces 209 which each are provided with a borehole pattern matching that of the mounting surfaces 199 (FIGS. 6 and 8). On the top of the setting gauge 200 is secured a strut 210 which is provided with matched boreholes 211 (see also FIG. 12) at the spacing of the longitudinal axes 12, 12 (FIG. 6) from each other.

Figure 11:
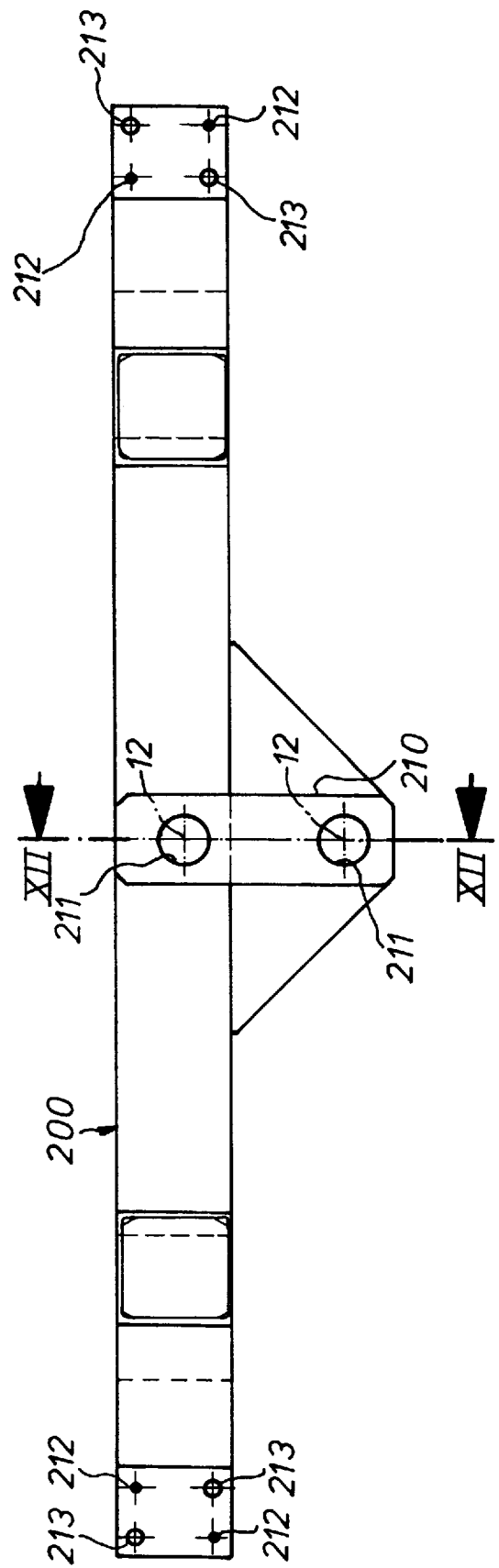
FIG. 11 is the plan view of the setting gauge according to FIG. 10.

FIG. 11 shows on the one hand the position of the matched boreholes 211 and on the other hand the position of matched boreholes 212 and through bores 213 which exit at the respective mounting surfaces 209 (FIG. 10).

FIG. 12 shows the setting of the gob distributor 189 relative to the already mounted holding device 175. For this, the setting gauge 200 is mounted on the holding device 175.

Additionally, centering pins 214 are introduced from above into the inlet funnels 215, the rotary sleeves 197 and the intermediate tubes 198. For this, the scoops 8, 8 have first to be dismantled from the intermediate tubes 198. Consequently, in FIG. 12, the upper parts of the scoops 8 are indicated only by chain-dotted lines. Each centering pin 214 is provided at the bottom with a calibrated pin 216 which, in the finally adjusted position of the gob distributor 189, fits into the associated matched borehole 211. When this adjusted position of the gob distributor 189 has been achieved, the set pins 192 (FIG. 6) are inserted and the bolts 193 are screwed in, so that the gob distributor 189 is then fully located in the centered position on the scoop beam 171.

Then, the centering pins 214 and the setting gauge 200 are again disassembled and the assembly of the I.S. glassware forming machine 170 continues.

Figure 13:
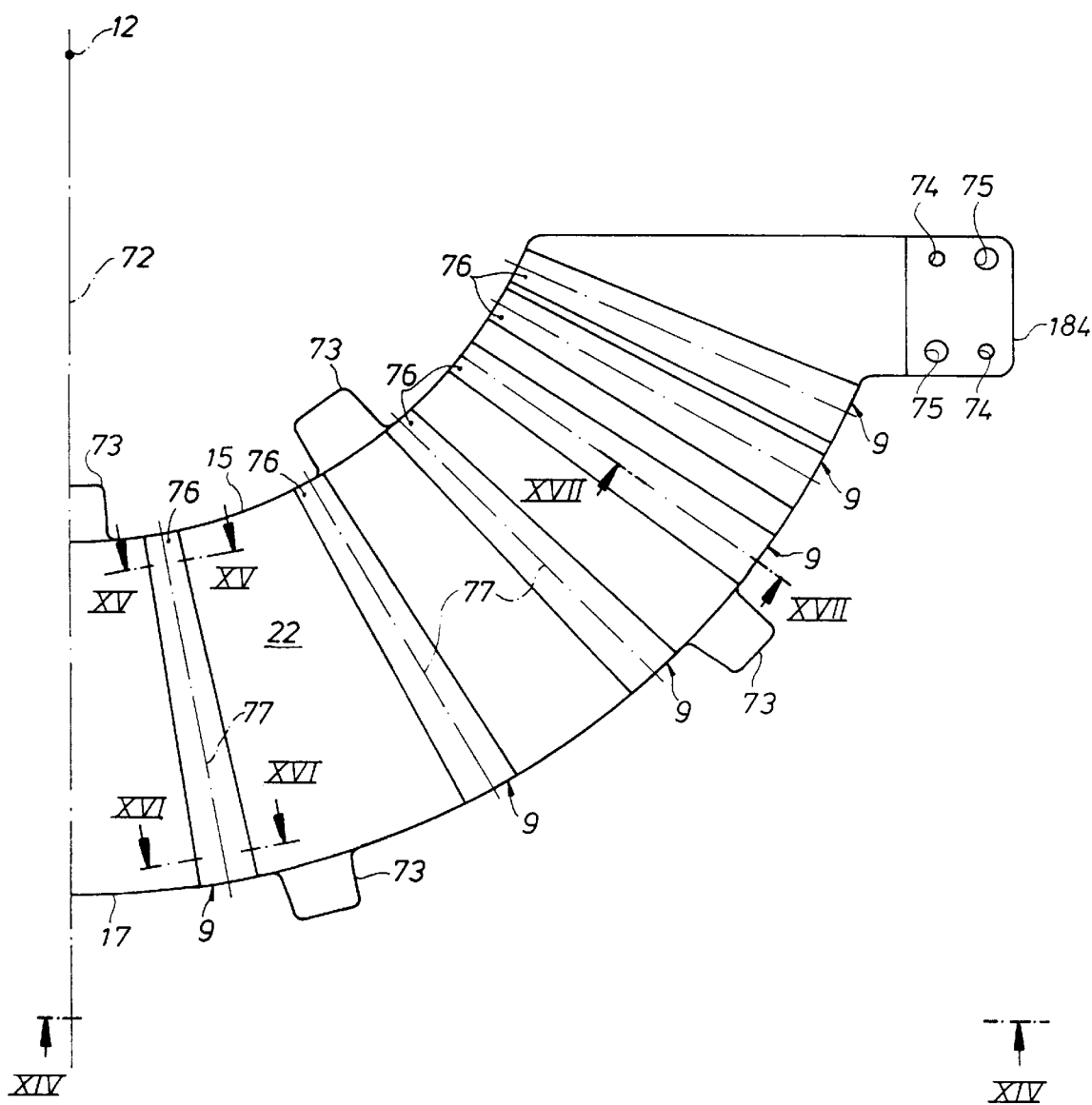
FIG. 13 is the plan view of one-half of a slide unit of the delivery system.

FIG. 13 shows six slide members 9 relating to one-half of a twelve-section I.S. glassware forming machine 170, with the slide members being connected to each other to make the slide unit 71. The other half of the slide unit 71 is formed as a mirror image about the axis 72. The slide unit 71 is in this case formed as a cast member and is provided with radially projecting clamping cams 73 for the working process. The outer clamping cams 73 may be severed upon the working of the slide unit 71.

In the upper slide surface 22 of each slide member 9 there is provided a slide channel 76 to guide the gobs. The longitudinal axis 77 of each slide channel 76 lies in a plane through the longitudinal axis 12 of the gob outlet 6 (FIG. 1). The longitudinal axis 77 of the slide channel 76 lies in a common vertical plane with the longitudinal axis of the scoop 8 when the scoop is positioned to deliver the gobs and also in a common vertical plane with the longitudinal axis of trough 10. The mounting piece 184 is provided with matched boreholes 74 for the set pins 187 (FIG. 6) and with through bores 75 for the bolts 188 (FIG. 6).

Figure 14:
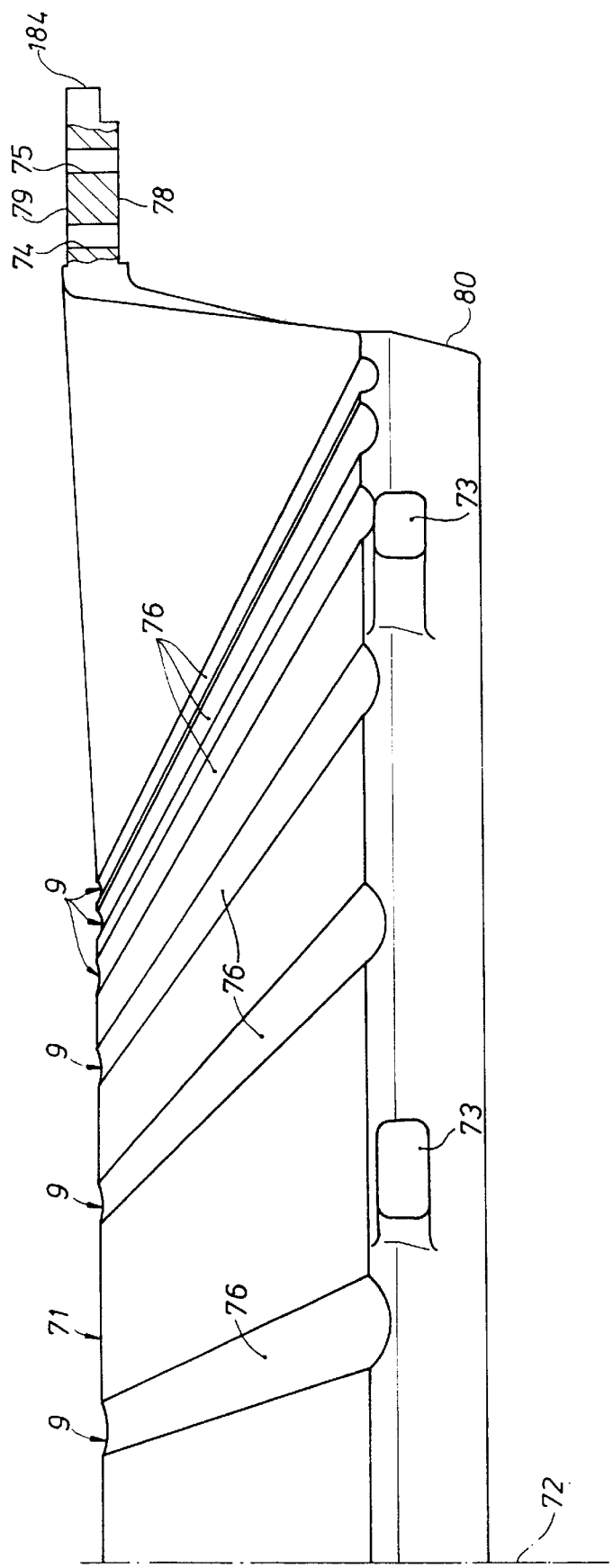
FIG. 14 is the front view taken along the line XIV—XIV in FIG. 13.

FIG. 14 shows a further view of the half slide unit 71 which is shown in FIG. 13, from which further details can be appreciated. In this particular case each of the two mounting pieces 184 is provided with a lower mounting surface 78 and an upper mounting surface 79. The mounting surfaces 78, 79 are parallel to each other. In this embodiment the slide unit 71 can be used either as an upper slide unit 71 as shown in FIG. 6 or alternatively as a lower slide unit 186 as shown in FIG. 6. The two slide units can thus be made identical in order to simplify the manufacture and warehousing.

As shown in FIG. 14, at the bottom of the slide unit 71 is formed a continuous apron 80 whose purpose will be described hereinafter with reference to FIG. 17.

Figure 16:
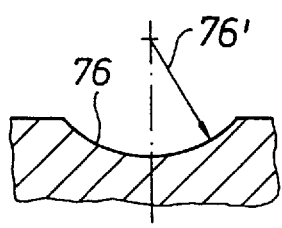
FIG. 16 is the sectional view taken along the line XVI—XVI in FIG. 13.
Figure 15:
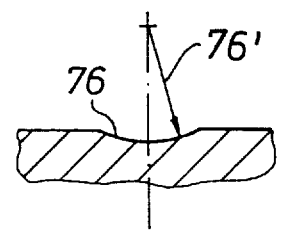
FIG. 15 is the sectional view taken along the line XV—XV in FIG. 13.

The depth of the slide channels 76 increases from the upper end 15 towards the lower end 17 of the slide member 9. The slide channels 76 are part-circular in cross-section, as can be better appreciated from the more detailed cross-sections shown in FIGS. 15 and 16. There, a radius 76' is indicated for each of the cross-sectional profiles of the respective slide channels 76.

FIG. 17 makes the arrangement and construction of the slide channels 76 even clearer. The bottom apex lines of each slide channel 76 is inclined relative to the horizontal at an angle 81 of, for example, 26°.

As shown in FIG. 17, an inclined, slot-like aperture 82 is machined into the apron 80 for each slide member 9. Into the aperture 82 is fitted a rearwardly extending spigot 83 of the carrier member 36 (see FIG. 1) with lateral play (see FIG. 18). The bolt 37 is screwed into a threaded bore in the spigot 83 and draws a seating surface 84 of the carrier member 36 against a counter surface 85 of the apron 80. In this manner the carrier member 36 can be fixed in the desired position relative to the slide unit 71.

The ball member 40 is flattened at the bottom and is secured to the carrier member 36 by a screw 86. FIG. 17 illustrates how the ball member 40 is engaged by the ball cage 39 of the trough 10.

The ball cage 39 is formed on a separate component 87 which is screwed to the underside of the trough 10 (see also FIGS. 25 and 26).

FIG. 18 illustrates the capacity for lateral movement of the spigot 83 in the hole 82. As needed, the spigot 83 can also be adjusted transversely to the longitudinal extent of the hole 82 in its height relative to the slide unit 71. Then, differing from the illustration in FIG. 17, there must be a degree of play between the spigot 83 and the hole 82 also in the vertical direction. Thus, the upper end of the trough 10 can be adjusted in three dimensions relative to the slide unit 71.

Figure 19:
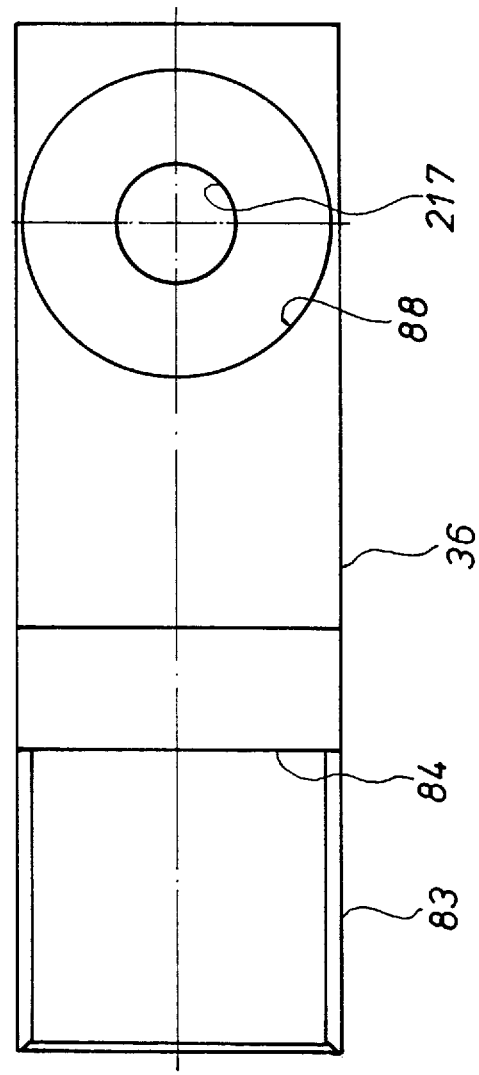
FIG. 19 is the view taken along the line XIX—XIX in FIG. 17 of a carrier member.

FIG. 19 shows a plan view of the carrier member 36 which has an indentation 88 to receive a foot of the ball member 40 (FIG. 17) and a through bore 217 for the screw 86.

FIG. 20 shows one of the troughs 10 which is provided with a lower bearing surface 89 for the setting device 43. At the upper end 18 the trough 10 is equipped on its underside with the ball cage 39, which is molded on in this case and which essentially represents a lower extension of the trough 10. A bore 90 is machined into this extension from below, with a diameter which is a little larger than the diameter of the ball member 40 (FIG. 1). Thus, the ball cage 39, as is shown schematically in FIG. 2, can engage around the ball member 40, with the ball member seating against an upper boundary surface 91 of the bore 90.

Figure 21:
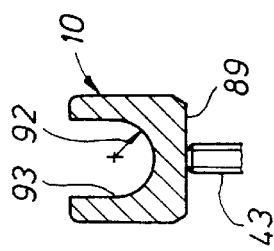
FIG. 21 is the sectional view taken along the line XXI—XXI in FIG. 20.

FIG. 21 shows the cross-section of the trough 10 and how the trough 10 rests upon the setting device 43. The internal profile of the trough 10 which guides the gobs is of semi-circular cross-section at the bottom with the radius 92, from which portion there are upwardly extending flat vertical side walls 93.

Figure 22:
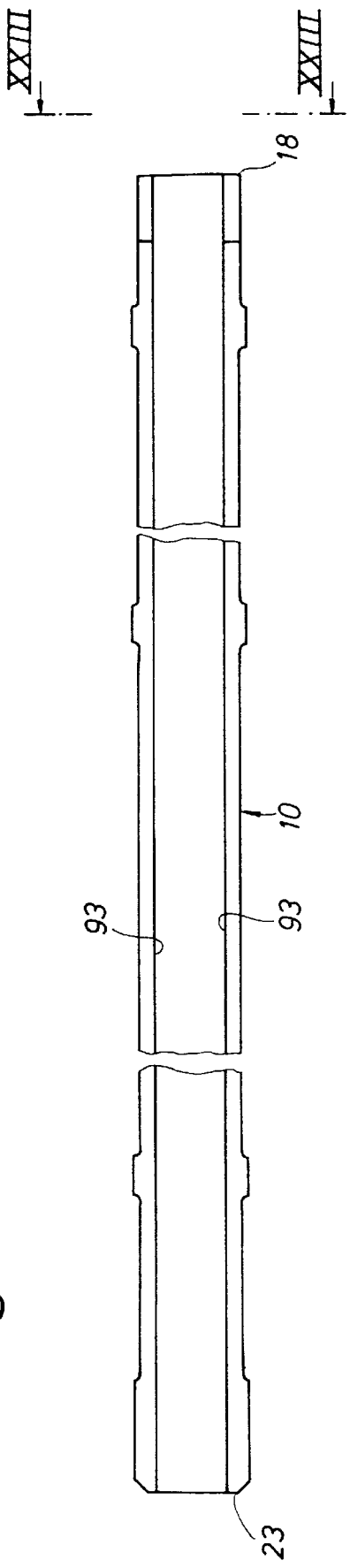
FIG. 22 is the plan view taken along the line XXII—XXII in FIG. 20.

In the embodiment shown in FIG. 22 this profile of the trough 10 is constant throughout its full length. Alternatively, a slender funnel can be provided at the input to the trough.

Figure 23:
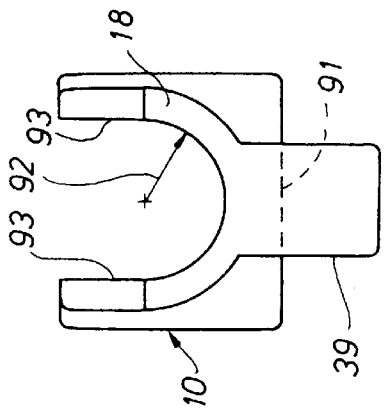
FIG. 23 is the front view taken along the line XXIII—XXIII in FIG. 22, on an enlarged scale.

FIG. 23 again shows this internal profile of the trough 10 and also the front view of the ball cage 39 with its upper boundary surface 91 shown by a broken line.

The trough 10 shown in FIG. 24 is designed for the outermost sections of an I.S. glassware forming machine and is tapered or reduced at its upper end 18 by an angle 95, over a length 94, on both sides. Thus, the outermost troughs 10 can be positioned comparatively far upwards, without coming into lateral contact with the adjacent troughs 10.

FIG. 25 shows details of the separate component 87 (FIG. 17). The component 87 has a centering peg 218 at the top which engages in a centering bore 219 (FIG. 17) in the underside of the trough 10. The component 87 is also provided with through bores 220 for bolts by means of which the component 87 is bolted to the underside of the trough 10.

FIG. 26 shows further details of the component 87.

FIG. 27 shows further details of the upper region of the deflector 11. The bracket 47 is provided with threaded bores 96 in which screws for fastening the support arm 49 (FIG. 3) are fitted. Clamping surfaces 97 are distributed over the length of the deflector 11, as with the troughs 10 (e.g. FIG. 22), by means of which the deflectors 11 can be clamped and can then be mechanically handled.

Figure 28:
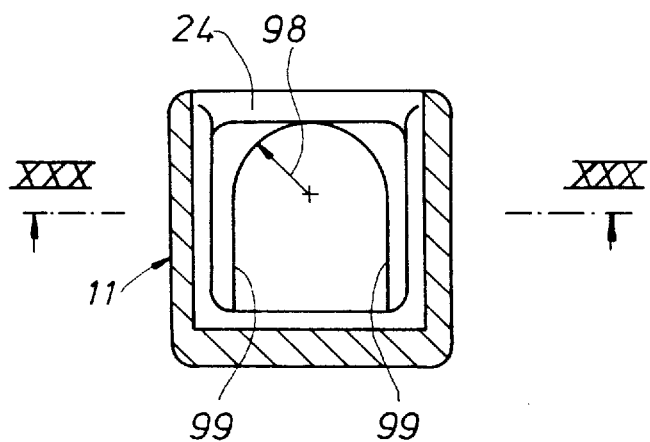
FIG. 28 is the sectional view taken along the line XXVIII—XXVIII in FIG. 27.
Figure 29:
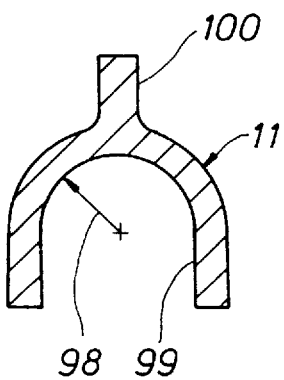
FIG. 29 is the sectional view taken along the line XXIX—XXIX in FIG. 27.

FIGS. 28 and 29 show the cross-sectional profile of the deflector 11, which is shaped towards the outside as a semi-circle with the radius 98. From the semi-circle extend flat vertical side walls 99, so that one has a substantially U-shaped profile overall. On the outside there is an integral longitudinal rib 100 on the trough profile to stiffen the profile.

Figure 30:
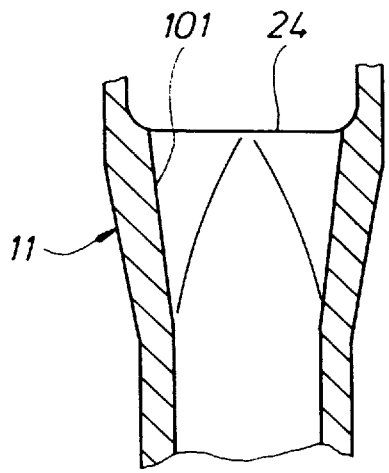
FIG. 30 is the sectional view taken along the line XXX—XXX in FIG. 28.

As shown in FIG. 30, at the upper end 24 of the deflector 11 the trough profile is provided with a funnel-shaped enlargement 101 in the upward direction, with the result that the catching of the gob coming from the trough is facilitated and improved.

FIG. 31 shows particularly well the chute 42 for receiving and laterally guiding the lower end 23 of the trough 10 (FIG. 1).

Figure 32:
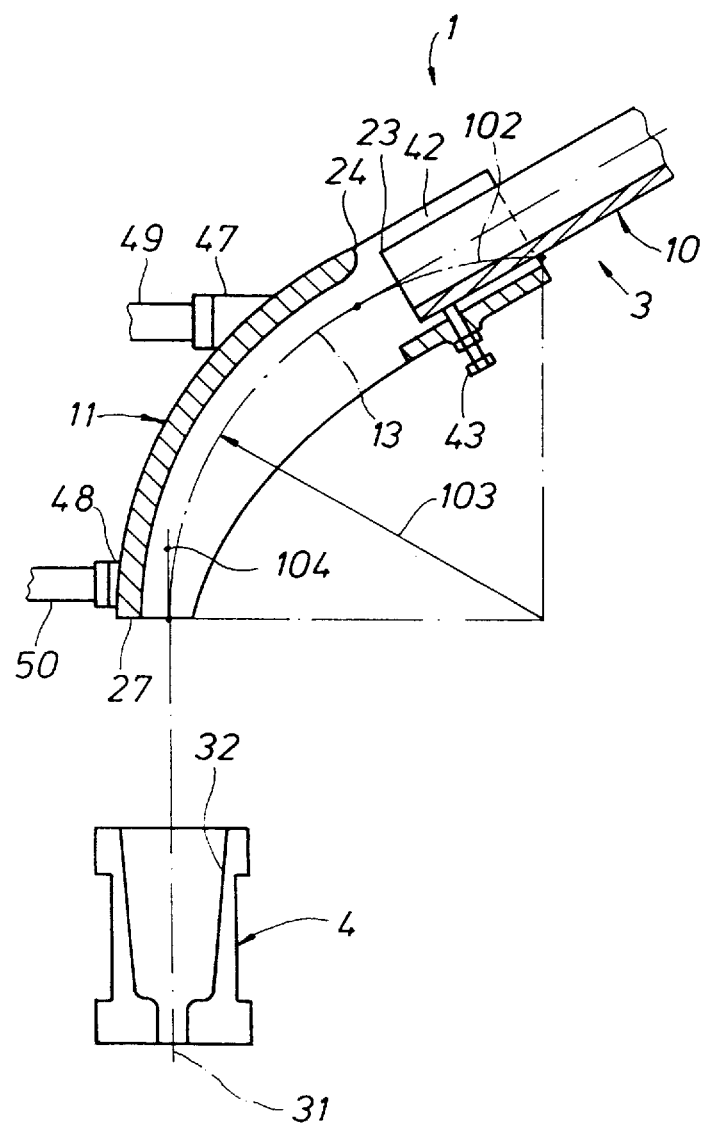
FIG. 32 is a longitudinal sectional view through the lower part of a trough and another embodiment of deflector.

In the embodiment shown in FIG. 32 the path of movement 13 of the longitudinal axis of the gobs in the deflector 11 is shown as part of a quarter circle 102 having a radius 103. The portion of the path of movement 13 in the region of the trough 10 merges tangentially with the quarter circle 102. At the lower end 27 of the deflector 11 a vertical tangent 104 to the path of movement 13 is coaxial with the longitudinal axis 31 of the mold 4. The gobs in this case drop from the lower end 27 of the deflector 11 in free fall into the mold recess 32.

Figure 33:
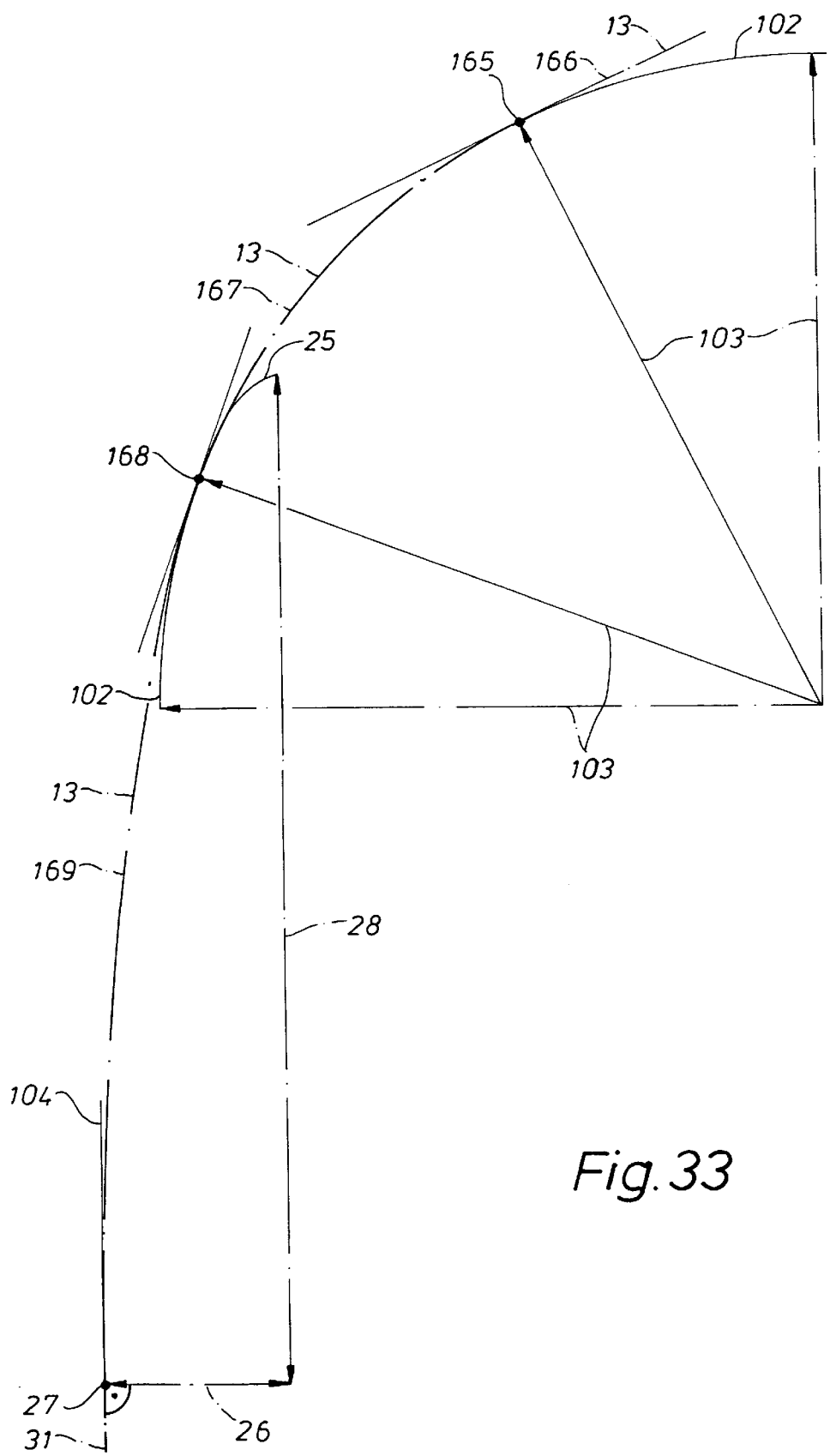
FIG. 33 is a schematic illustration of the course of the path of movement of the gob in another deflector.

FIG. 33 shows a further embodiment of the path of movement 13 of the longitudinal axes of the gobs. At a point 165 the path of movement 13 goes from a downwardly inclined section 166 of the path of movement 13 at the lower end of the trough 10 (FIG. 1) tangentially into a portion 167 of a quarter circle 102 having the radius 103. The portion 167 of the path of movement 13 for its part goes at a point 168 tangentially into a lower portion 169 of a quarter ellipse 25. The portion 167 approaches (merges with) the quarter ellipse 25 from the outside (the convex side). At the lower end 27 (FIG. 1) of the deflector 11 the minor half axis 26 of the quarter ellipse 25 is perpendicular to the path of movement 13 and is horizontal, so that the portion 169 undergoes transition to the vertical tangent 104 on to the longitudinal axis 31 of the mold 4 (FIG. 1). To complete the picture, the major half axis 28 of the quarter ellipse 25 is also indicated.

Figure 34:
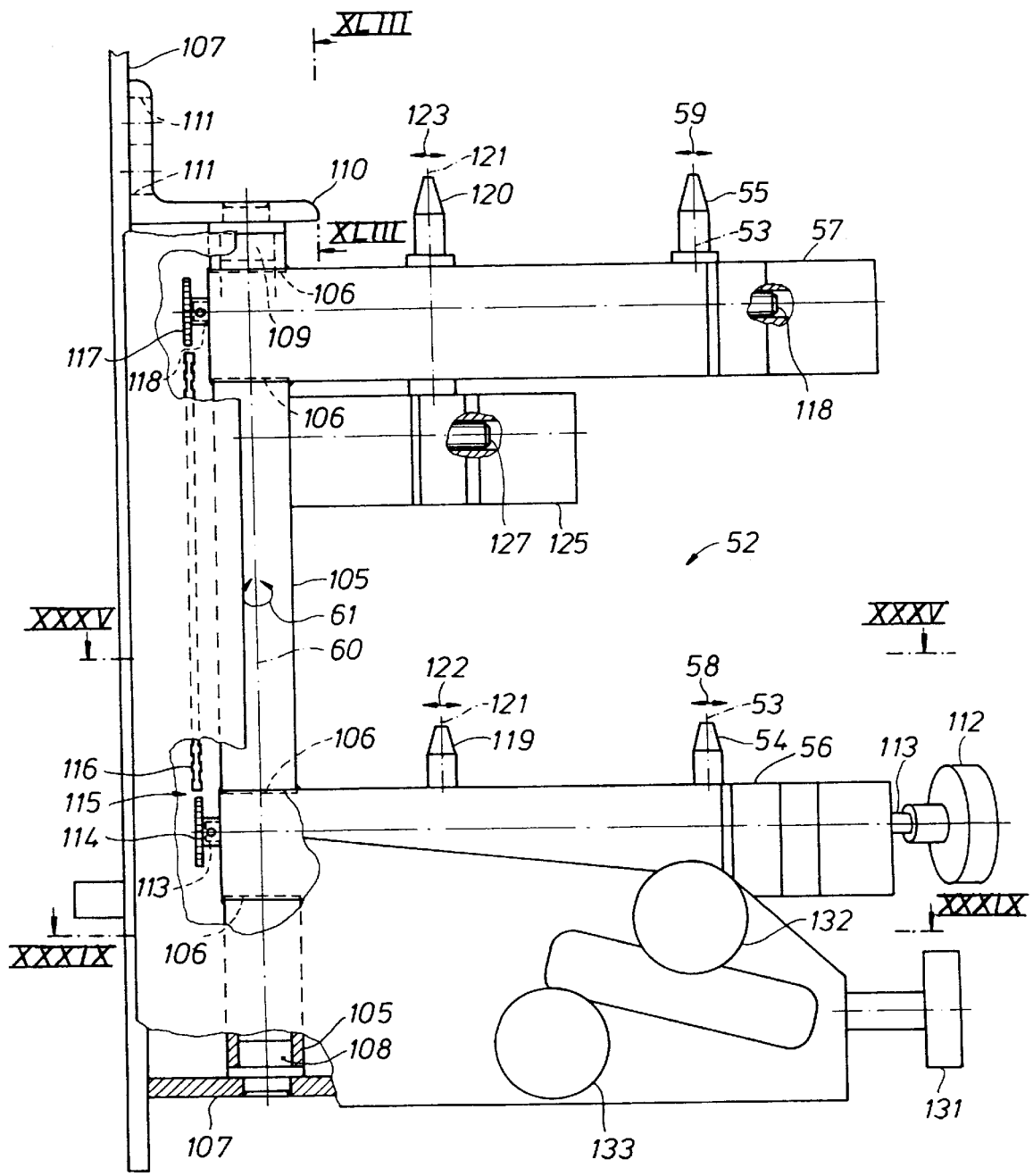
FIG. 34 is a side view, partly broken away, of an adjustment device for two deflectors utilizable according to FIG. 2 for double-gob operation.

As shown in FIG. 34, the struts 56, 57 are secured vertically spaced from each other both on a common column 105 which is swivellable about the first swivel axis 60. For this, sections of the column 105 are inserted into respective complementary pockets 106 of the struts 56, 57 to center them, and are welded to the struts. The column 105 is tubular. At the bottom of the column 105 there is fitted a bearing pin 108 which is welded to a frame 107 which is fixed relative to the machine. A similar bearing pin 109 is fitted from above into the top of the column 105. The bearing pin 109 is welded to an angle piece 110 which is fixed to be adjustable vertically on the frame 107 by means of elongate holes 111 (see also FIG. 43), such that one has an overall strict but easily utilizable swivel mounting of the column 105.

The simultaneous setting of the coupling members 54, 55 in the direction of the double arrows 58, 59 is effected in a manner which will be described hereinafter by means of a hand wheel 112 and an axially fixed first threaded spindle 113. The first threaded spindle 113 extends the length of the whole strut 56 and carries, as shown at the left-hand end of FIG. 34, a chain wheel 114 of a gear mechanism 115. The gear mechanism 115 also comprises a chain 116 which runs at the bottom over the chain wheel 114 and at the top over a similar chain wheel 117. The upper chain wheel 117 is fixed at the left-hand end of a further first threaded spindle 118 which extends through the upper strut 57 along its length. The first threaded spindle 118 moves the coupling member 55 in the same sense as and simultaneously with the movement of the coupling member 54. As needed, a suitable chain tensioner can be provided in order to set the optimum tension for the chain 116.

Since the setting device 52 shown in FIG. 34 is one which is appropriate for double-mold operation as shown in FIG. 2, besides the coupling members 54, 55, there are provided two further coupling members 119 and 120 which are vertically spaced from each other and are aligned with each other along a vertical axis 121. The coupling members 119, 120 are displaceable in the same manner as the coupling members 54, 55 in the direction of double arrows 122 and 123 on elongate struts 124 (FIG. 35) and 125. In an analogous manner, first threaded spindles 126 (FIG. 39) and 127 serve, for this purpose, with the spindles again being connected to each other by means of a gear mechanism 128 (FIG. 39) which is designed as a chain drive. The struts 124, 125 are fixed on a column 129 (FIGS. 35 and 39) which is arranged parallel to the column 105 in the same manner. A first swivel axis 130 of the column 129 extends parallel to the first swivel axis 60. The common displacement movement of the coupling members 119, 120 is effected by a hand wheel 131, as will be described hereinafter with reference to FIG. 39.

The swivel movement of the struts 56, 57 about the first swivel axis 60 is effected by the actuation of a handwheel 132. In similar manner, the struts 124, 125 are swivellable about the first swivel axis 130 by means of a handwheel 133.

Figure 35:
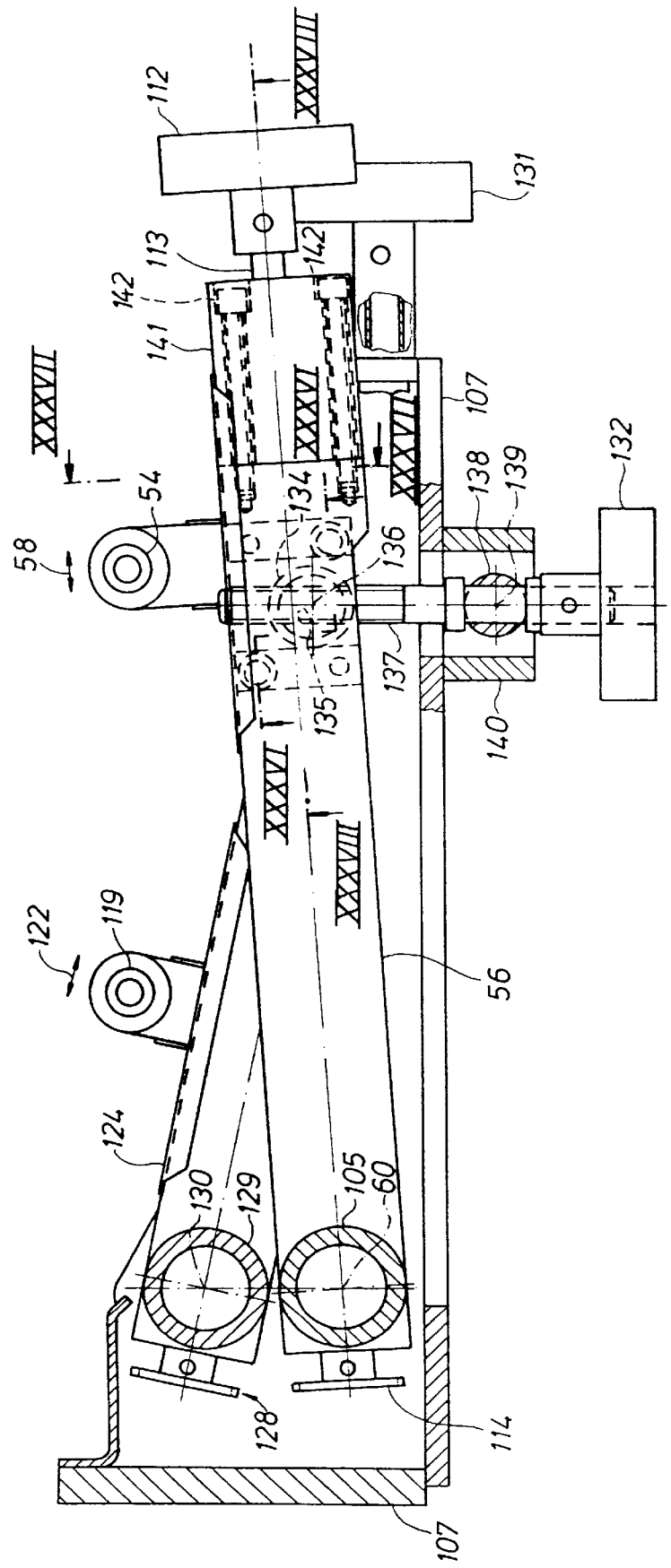
FIG. 35 is the sectional view taken along the line XXXV—XXXV in FIG. 34.

Suitable means for this for the struts 56, 57 is shown in FIG. 35. A nut 134 having a circular cylindrical external surface and transverse threaded bore 135 is provided on the strut 56 spaced from the first swivel axis 60. The nut 134 is mounted to be swivellable about a second swivel axis 136 which is parallel to the first swivel axis 60. Transversely to a connecting line between the two swivel axes 60 and 136 there extends a second threaded spindle 137 which engages in the threaded bore 135 of the nut 134. The second threaded spindle 137 is held in place in the axial direction by a bearing pin 138 through which the spindle passes. The bearing pin 138 is mounted in an extension 140 of the frame 107 to be swivellable about a third swivel axis 139. The rotation of the handwheel 132 leads to a swivelling of the second threaded spindle 137 about the third swivel axis 139 and finally leads to a swivelling of the struts 56, 57 about the first swivel axis 60.

From FIG. 35 it can be seen that a headpiece 141 of the strut 56 is fixed by bolts 142 to the rest of the strut 56.

Figure 36:
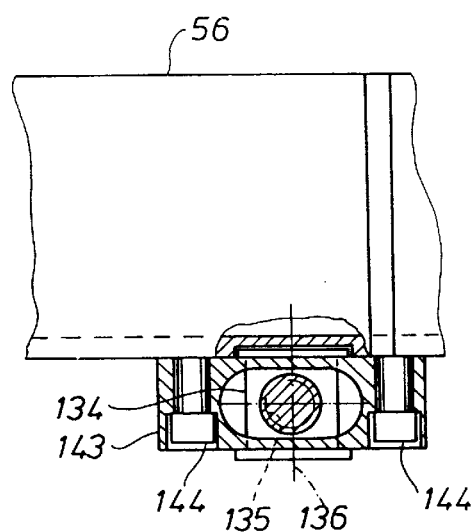
FIG. 36 is the sectional view taken along the line XXXVI—XXXVI in FIG. 35.

FIG. 36 shows details of the swivel mounting of the nut 134. For this, a bearing block 143 is held by screws 144 to the underside of the strut 56.

Figure 37:
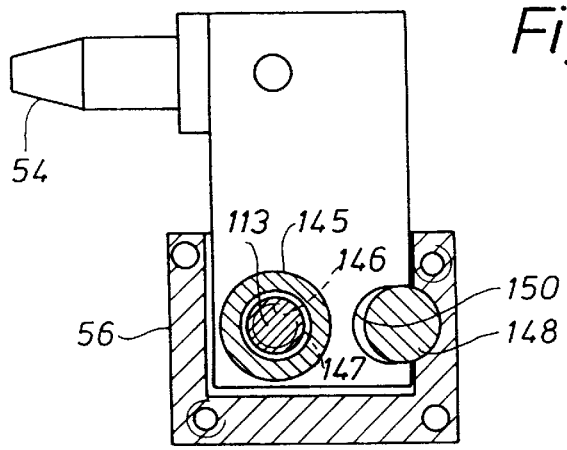
FIG. 37 is the sectional view taken along the line XXXVII—XXXVII in FIG. 35.
Figure 38:
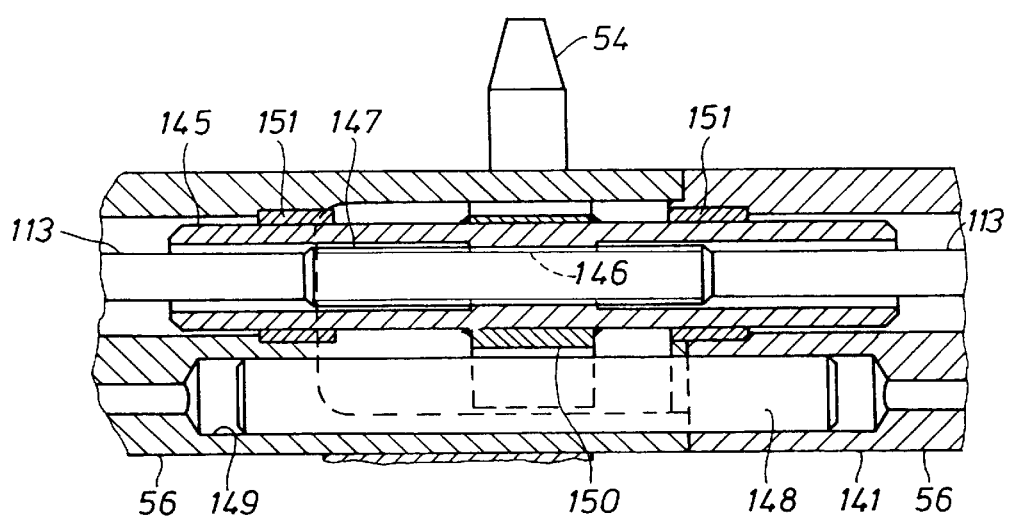
FIG. 38 is the sectional view taken along the line XXXVIII—XXXVIII in FIG. 35.

As shown in FIG. 37, the coupling member 54 is secured, for example, by welding (FIG. 38) to a threaded sleeve 145. The threaded sleeve 145 has an external thread 146 which engages with an external thread 147 on the first threaded spindle 113. A rotation of the first threaded spindle 113 thus entrains the threaded sleeve 145 and consequently moves the coupling member 54 in the axial direction. An undesirable tilting of the coupling member 54 about the longitudinal axis of the first threaded spindle 113 is prevented by a guide pin 148 which, as shown in FIG. 38, is mounted in a bore 149 in the strut 56. The coupling member 54 has a lower recess 150 which receives the guide pin 148.

FIG. 38 shows how the threaded sleeve 145 is mounted for axial displacement by means of slide bearings 151 in the strut 56. The headpiece 141 makes it possible to assemble and dismantle the guide pin 148 in the strut 56.

The swivel movement of the struts 124, 125 about the first swivel axis 130 is solved in similar manner. For this purpose reference is now made to FIGS. 35 to 42 in which, so far as is possible, the same reference numerals have been used for corresponding structural elements. The swivel movement about the first swivel axis 130 is effected by actuation of the handwheel 133.

Figure 42:
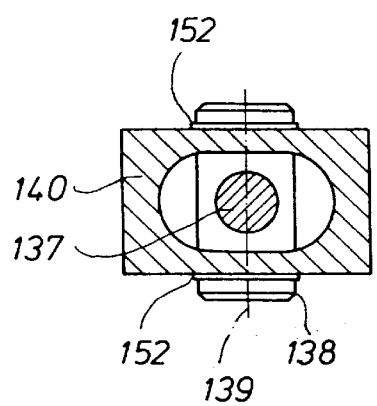
FIG. 42 is the sectional view taken along the line XLII—XLII in FIG. 39.

FIG. 42 shows how the bearing pin 138 is held by circlips 152 adjacent axial movement relative to the spigot 140.

Figure 39:
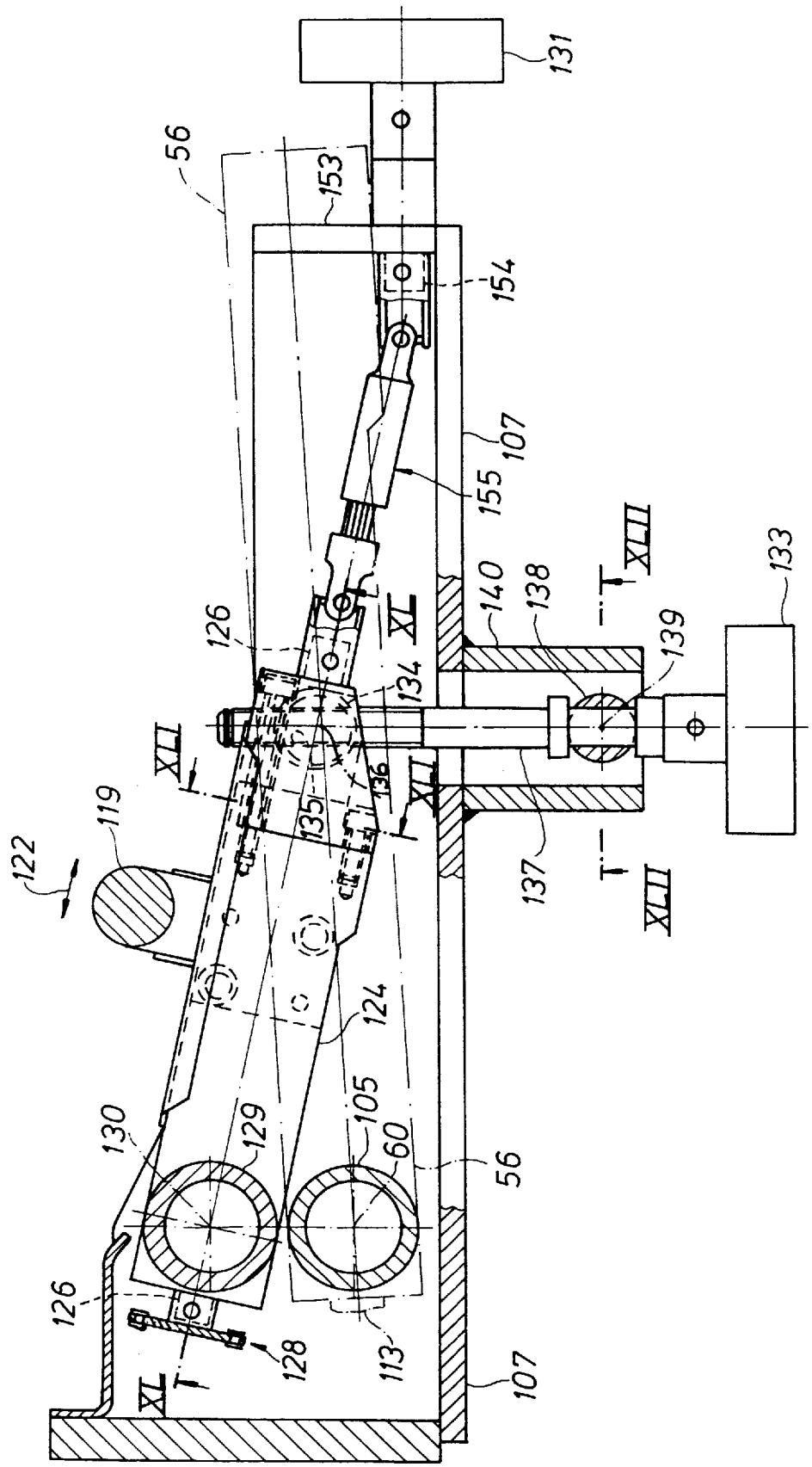
FIG. 39 is the sectional view taken along the line XXXIX—XXXIX in FIG. 34.
Figure 40:
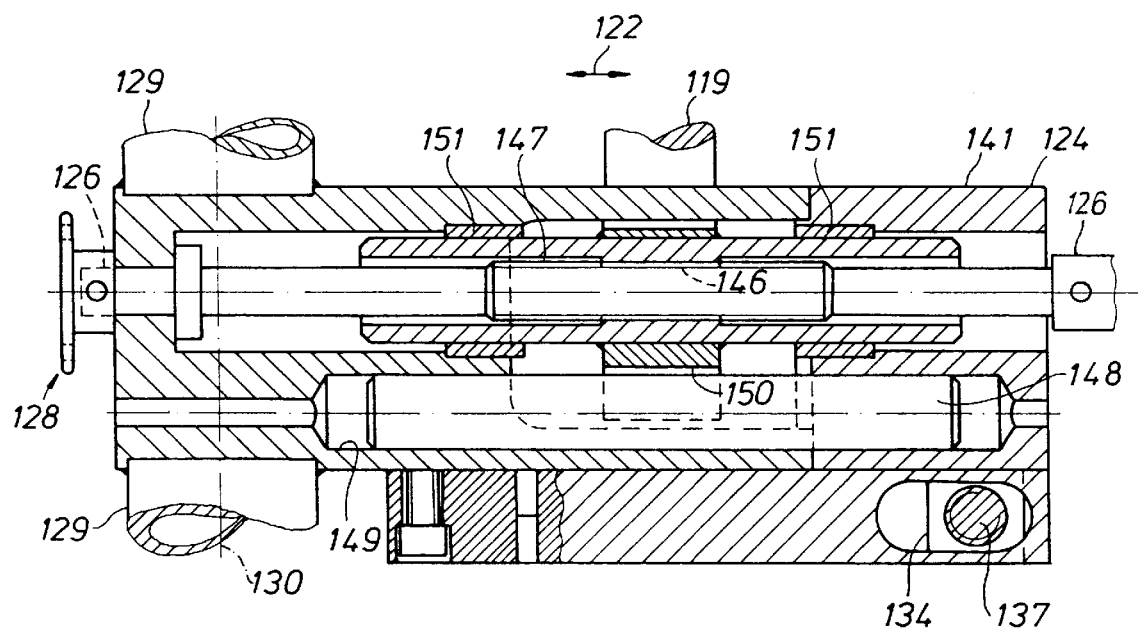
FIG. 40 is the sectional view taken along the line XL—XL in FIG. 39.
Figure 41:
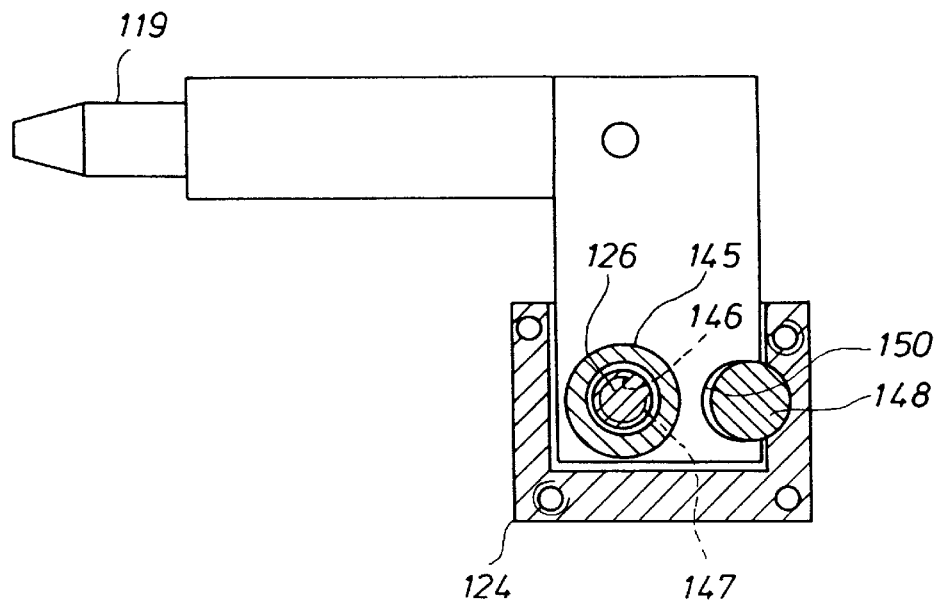
FIG. 41 is the sectional view taken along the line XLI—XLI in FIG. 39.

As shown in FIG. 39, the handwheel 131 is not fixed directly to the first threaded spindle 126, but is rotatably mounted on a front wall 153 of the frame 107. By this means a shaft stump 154 is rotatably driven, with the one end of a telescopic connecting shaft 155 being connected to the stump. The other end of the connecting shaft 155 is connected to the first threaded spindle 126. In this way the displacement of the coupling member 119 can be effected in the direction of the double arrow 122 independently of the swivel movement of the strut 124 about the first swivel axis 130.

By the superimposition of the swivelling of the struts 56, 57 and 124, 125 about the first swivel axes 60, 130 on the one hand and the longitudinal movement of the coupling members 54, 55 and 119, 120, the coupling members can be adjusted at any point in two dimensions in a plane perpendicular to the first swivel axes 60, 130.

Figure 43:
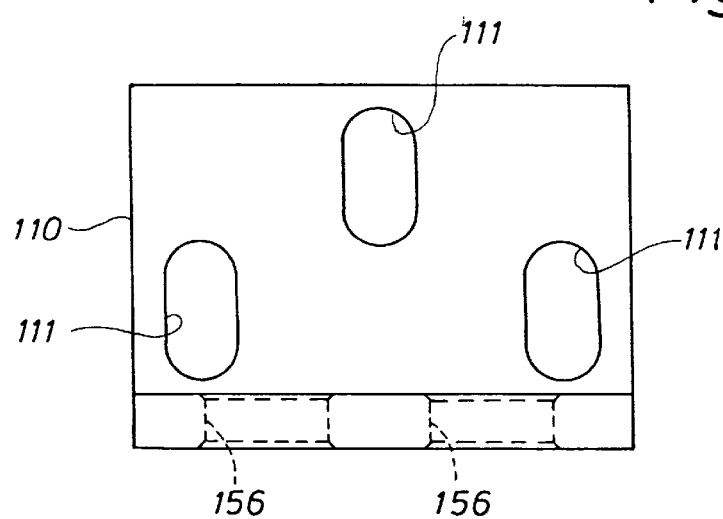
FIG. 43 is the side view taken along the line XLIII—XLIII in FIG. 34.

FIG. 43 shows the configuration and arrangement of the elongate holes 111 in the angle piece 110, as well as receiving bores 156 for the upper ends of the bearing pins 109 (FIG. 34).

U.S. patent application Ser. No. 08/142,386 is hereby incorporated by reference.

While particular embodiments of the present invention have been illustrated and described herein, the present invention is not intended to be limited to such illustrations and description. Changes and modifications may be incorporated and embodied as part of the present invention within the scope of the following claims.

We claim:

1. A delivery apparatus for transporting gobs of molten glass from a gob feeder into molds of at least one glassware forming machine, comprising:

a curved scoop for catching a gob coming from the gob feeder and directing the gob downward at an angle;

a trough which is approximately linear and downward sloping, said trough having an upper end for receiving the gob and a lower end, and said trough being articulately mountable relative to the glassware forming machine at the trough upper end;

an setting device for raising and lowering the lower end of said trough;

a curved deflector for receiving the gob coming from the trough and deflecting the gob in a downwards path coaxial with a longitudinal axis of a mold;

a setting device for adjusting said deflector in infinite direction in a plane perpendicular to the longitudinal axis of the mold for aligning said deflector with said mold;

wherein the setting device comprises at least one coupling member carrying the deflector;

wherein each said coupling member is rotatable to allow rotational movement of each said coupling member and said deflector about an axis parallel to the longitudinal axis of the mold; and wherein each said coupling member is adjustable in a plane perpendicular to the longitudinal axis of the mold.

2. A delivery apparatus according to claim 1 including a strut for each said coupling member and wherein each said coupling member is displaceable lengthwise on said strut in a plane perpendicular to the longitudinal axis of the mold, and each said strut is rotatable about a first axis which is fixed relative to the glassware forming machine and which is parallel to the longitudinal axis of the mold.

3. A delivery apparatus according to claim 2 wherein each said coupling member is fixed to a threaded sleeve which is displaceably mounted for lengthwise movement on the strut, and an axially fixed first threaded spindle engages a thread of the threaded sleeve.

4. A delivery apparatus according to claim 3 having two coupling members for the deflector, said coupling members being spaced from one another and aligned, and wherein each strut is fixed on a common column rotatable about the first axis, and wherein each said first threaded spindle of the coupling members is connected to one another by a gear means.

5. A delivery apparatus according to claim 2 wherein a nut is mounted on the strut spaced from the first axis, said nut being rotatable about a second axis which is parallel to the first axis, and wherein an axially fixed second threaded spindle extends transversely to a connecting line between the first and second axes and perpendicular to the second axis and engages in a threaded bore in the nut.

6. A delivery apparatus according to claim 1 wherein the curvature of the deflector defines a surface of the deflector that is part of a quarter ellipse, and wherein, at a lower end of the deflector, a minor half axis of the quarter ellipse lies horizontal.

7. A delivery apparatus according to claim 1 wherein the curvature of the deflector defines a surface of the deflector that is a part of a quarter circle, and wherein, at a lower end of the deflector, a tangent to the quarter circle is coaxial with respect to the longitudinal axis of the mold.

8. A delivery apparatus according to claim 1 wherein the curvature of the deflector defines a surface of the deflector which is first part of a quarter circle and thereafter part of a quarter ellipse, and wherein, at a lower end of the deflector, a minor half axis of the quarter ellipse lies horizontal.

9. A delivery apparatus according to claim 8 wherein the quarter circle merges with the quarter ellipse defined by said deflector from outside the quarter ellipse.

10. A delivery apparatus according to claim 1 wherein a path of movement of the gob in the trough merges tangentially into a path of movement of the gob in the deflector.

11. A delivery apparatus according to claim 1 comprising more than one said scoop, more than one said trough, and more than one said deflector for use with multiple gob operation wherein more than one said gob is fed approximately simultaneously in said glassware forming machine, wherein the number of said scoops, troughs, and deflectors correspond to the number of gobs fed approximately simultaneously.

12. A delivery apparatus according to claim 1 further comprising a slide member arranged between a lower end of said scoop and said upper end of said trough for conducting the gob from said scoop to said trough, said slide member being fixedly supported and remaining stationary relative to the glassware forming machine and having a downwardly inclined upper slide surface for the gob.

13. A deliver apparatus according to claim 12 further comprising a slide unit having a plurality of said slide members connected to one another and wherein all said slide members are disposed to receive gobs from said scoop.

14. A delivery apparatus according to claim 13 wherein said slide unit is connected to a holding device, and said holding device is fixedly mounted relative to said glassware forming machine.

15. A delivery apparatus according to claim 14 further comprising:

a setting gauge capable of being connected to said holding device; and a gob distributor having said scoop and which is adjustable relative to said setting gauge when said gauge is connected to said holding device, and which is fixedly mountable relative to said glassware forming machine.

16. A delivery apparatus according to claim 12 wherein a slide channel guiding the gob is provided in the upper sliding surface of said slide member to guide the gob, and wherein said slide channel lies in a common vertical plane with said scoop when said scoop is positioned to deliver the gob and also in a common vertical plane with said trough.

17. A delivery apparatus according to claim 12 further comprising a first gap between the lower end of said scoop and an upper end of said slide member, and a second gap between a lower end of said slide member and said upper end of the trough.

18. A delivery apparatus according to claim 12 further comprising first and second steps perpendicular to a path of movement of the gob, said first step being at said lower end of said scoop relative to an upper end of said slide member, and said second step being at a lower end of said slide member relative to said upper end of said trough.

19. A delivery apparatus according to claim 1 wherein an internal surface of the scoop has, at an upper end of said scoop, a downwardly narrowing, tapered funnel region which is contacted first by the gob, and wherein the funnel region includes a bottom having a tangential transition to a part-circular region of the internal surface of the scoop.

20. A delivery apparatus according to claim 1 wherein said trough is mountable to the glassware forming machine at the upper end of said trough by means of a universal joint and wherein said deflector includes a chute at its upper end, the lower end of said trough extends into said chute with freedom for movement in a vertical plane and secured against rotation about its longitudinal axis.

\* \* \* \* \*

UNITED STATES PATENT AND TRADEMARK OFFICE
CERTIFICATE OF CORRECTION

PATENT NO. : 5,824,129
DATED : October 20, 1998
INVENTOR(S) : Manfred Struckmeier, et. al.

It is certified that error appears in the above-identified patent and that said Letters Patent is hereby corrected as shown below:

Column 16, line 58, "setting" should be

--adjustment--

Signed and Sealed this

Ninth Day of March, 1999

Attest:

Q. TODD DICKINSON

Attesting Officer

Acting Commissioner of Patents and Trademarks